(12) United States Patent
Koyama et al.

(10) Patent No.: US 6,309,579 B1
(45) Date of Patent: Oct. 30, 2001

(54) METHOD FOR FORMING A CASTING WHICH INCLUDES AN INSERT

(75) Inventors: Hiroshi Koyama, Tajimi; Tsutomu Onoue, Kariya; Keigo Asano, Toyohashi; Tadatsugu Nakamura, Aichi-ken; Izuru Shoji, Nishio, all of (JP)

(73) Assignee: Nippondenso Co., Ltd., Kariya (JP)

( * ) Notice: Subject to any disclaimer, the term of this patent is extended or adjusted under 35 U.S.C. 154(b) by 0 days.

(21) Appl. No.: 09/472,985

(22) Filed: Dec. 28, 1999

Related U.S. Application Data

(62) Division of application No. 08/649,306, filed on May 17, 1996, now Pat. No. 6,063,321.

(30) Foreign Application Priority Data

May 19, 1995 (JP) ..................................... 7-121706
Apr. 18, 1996 (JP) ..................................... 8-97044

(51) Int. Cl.[7] ............................ B29C 45/14; B29C 70/70
(52) U.S. Cl. ............................................................ 264/278
(58) Field of Search ............................... 264/259, 271.1, 264/272.11, 272.13, 278, 272.15, 328.7, 328.9, 327, 404; 425/116, 125, 547, 552, 577

(56) References Cited

U.S. PATENT DOCUMENTS

| 3,999,736 | 12/1976 | Theodorsen ..................... 264/46.4 |
| 4,377,548 | * 3/1983 | Pierpont ............................. 264/265 |
| 4,446,084 | 5/1984 | Rowley ............................. 264/40.6 |
| 4,470,786 | * 9/1984 | Sano et al. ........................ 425/125 |
| 5,137,677 | 8/1992 | Murata ......................... 264/272.16 |
| 5,418,454 | 5/1995 | Togo .............................. 324/207.15 |
| 5,435,953 | 7/1995 | Osada et al. ..................... 264/102 |
| 5,595,704 | 1/1997 | Hayashi et al. ................... 425/169 |
| 5,685,884 | 11/1997 | Van Den Berg ................. 425/125 |
| 5,770,941 | 6/1998 | Van Den Berg ................... 29/595 |

FOREIGN PATENT DOCUMENTS

| 55-91642 | 7/1980 | (JP) . |
| 5-21492 | 1/1993 | (JP) . |

* cited by examiner

*Primary Examiner*—Angela Ortiz
(74) *Attorney, Agent, or Firm*—Pillsbury Winthrop LLP

(57) ABSTRACT

An insert is held in a cavity within a die set by a movable hold member. Molten resin is injected into the cavity when the insert is held by the hold member. The hold member is separated from the insert at a given timing. A surface of the hold member is heated to a temperature higher than a temperature of an inner surface of the die set. The hold-member surface contacts the molten resin. The die-set inner surface is exposed in the cavity.

5 Claims, 21 Drawing Sheets

FIG. 19

| SAMPLE / TIME | A | B | C | D |
|---|---|---|---|---|
| HOLD PIN BODY | STAINLESS | METAL | METAL | CERAMIC |
| HEATING MEMBER | STAINLESS | W WIRE | CERAMIC | CERAMIC |
| TEMPERATURE INCREASE RATE | 30°C/s | 70°C/s | 80°C/s | 100°C/s |
| POWER CONSUMPTION RATE | 80W | 50W | 30W | 30W |
| STRENGTH | φ5 OR GREATER | φ3 OR GREATER | φ3 OR GREATER | φ3 OR GREATER |
| RELIABILITY IN REPETITION | △ | ○ | ○ | ○ |
| SYNTHETIC VALUATION | ○ | ○ | ○ | ◎ |

METHOD FOR FORMING A CASTING WHICH INCLUDES AN INSERT

This is a division of application Ser. No. 08/649,306, filed May 17, 1996, now U.S. Pat. No. 6,063,321.

BACKGROUND OF THE INVENTION

1. Field of the Invention

This invention relates to a method and an apparatus for forming a casting (a molding) which includes an insert. Examples of such a casting are electric coils or inductors, IC's, and thermistors which have inserts sealed in resin.

2. Description of the Prior Art

Some of known electric coils (electric inductors) and IC's have coatings of potting material or sealing plugs for providing waterproofness. It is known to seal electric parts in resin. Sealing electric parts in resin is advantageous in cost and recycling. Generally, sealing electric parts in resin uses an insert molding process which is good in cost and mass-productivity.

Japanese published unexamined patent application 55-91642 discloses an apparatus for forming a casting which includes an insert. In the apparatus of Japanese application 55-91642, dies have a cavity in which an insert is located, and the insert can be supported by hold pins capable of moving relative to the dies. During the formation of the casting, the insert is located at a given place within the cavity while being supported by the hold pins. Under these conditions, the cavity is charged with molten resin. Then, the hold pins are moved back from the cavity before the cavity is further charged with molten resin. The final casting contains the insert entirely sealed in the resin.

During the formation of the casting by the apparatus of Japanese application 55-91642, if the hold pins are moved back from the cavity before charging the cavity with molten resin is completed, the insert tends to be displaced by a motion of the molten resin. The displacement of the insert causes an unevenness in thickness of the final casting.

It is conceivable that the hold pins are moved back from the cavity after charging the cavity with molten resin is completed. In this conceivable case, solidified layers of resin have already been formed around the hold pins immediately before the hold pins are moved back from the cavity. As the hold pins are moved back from the cavity, molten resin enters and occupies the spaces resulting from the backward movement of the hold pins. The molten resin, which enters and occupies the spaces, tends to insufficiently fuse with the solidified layers. The insufficient fusion causes minute holes in the resin of the final casting which allow the introduction of water or others toward the insert. The minute holes correspond to unfused portions of the resin in the final casting.

SUMMARY OF THE INVENTION

It is a first object of this invention to provide an improved method of forming a casting (a molding) which includes an insert.

It is a second object of this invention to provide an improved apparatus for forming a casting (a molding) which includes an insert.

A first aspect of this invention provides a method of forming an insert-containing casting which comprises the steps of holding an insert in a cavity within a die set by a movable hold member; injecting molten resin into the cavity when the insert is held by the hold member; separating the hold member from the insert at a given timing; and heating a surface of the hold member to a temperature higher than a temperature of an inner surface of the die set, the hold-member surface contacting the molten resin, the die-set inner surface being exposed in the cavity.

A second aspect of this invention is based on the first aspect thereof, and provides a method wherein the heating step comprises heating the hold member to a temperature equal to or higher than a melting point of the injected resin.

A third aspect of this invention is based on the first aspect thereof, and provides a method wherein the separating step comprises separating the hold member from the insert after the injection of the molten resin into the cavity is completed.

A fourth aspect of this invention is based on the first aspect thereof, and provides a method further comprising the step of cooling a first region of the molten resin in the cavity at a rate greater than a rate of cooling of a second region of the molten resin in the cavity, the second region adjoining the hold member, the first region being more distant from the hold member than the second region is.

A fifth aspect of this invention is based on the fourth aspect thereof, and provides a method wherein the first region is thinner than the second region.

A sixth aspect of this invention provides a method of forming an insert-containing casting which comprises the steps of holding an insert in a cavity within a die set by a movable hold member; injecting molten resin into the cavity when the insert is held by the hold member; separating the hold member from the insert at a given timing; and cooling a first region of the molten resin in the cavity at a rate greater than a rate of cooling of a second region of the molten resin in the cavity, the second region adjoining the hold member, the first region being more distant from the hold member than the second region is.

A seventh aspect of this invention is based on the sixth aspect thereof, and provides a method wherein the first region is thinner than the second region.

An eighth aspect of this invention is based on the first aspect thereof, and provides a method wherein the holding step comprises simultaneously holding an inner portion and an outer portion of the insert by the hold member, the inner portion being inserted into the outer portion.

A ninth aspect of this invention provides an apparatus for forming an insert-containing casting which comprises a die set having a cavity; a hold member movably provided on the die set for holding an insert in the cavity; means for injecting molten resin into the cavity when the insert is held by the hold member; means for separating the hold member from the insert at a given timing; and means for heating a surface of the hold member to a temperature higher than a temperature of an inner surface of the die set, the hold-member surface contacting the molten resin, the die-set inner surface being exposed in the cavity.

A tenth aspect of this invention provides an apparatus for forming an insert-containing casting which comprises a die set having a cavity; means for controlling a temperature of the die set; a hold member movably provided on the die set for holding an insert in the cavity; means for injecting molten resin into the cavity when the insert is held by the hold member; means for separating the hold member from the insert at a given timing; and means for heating the hold member.

An eleventh aspect of this invention is based on the ninth aspect thereof, and provides an apparatus wherein the hold member comprises a heat feeding portion and a body covering the heat feeding portion.

A twelfth aspect of this invention is based on the eleventh aspect thereof, and provides an apparatus wherein the heat feeding portion comprising a heating member which generates heat when being supplied with an electric current.

A thirteenth aspect of this invention is based on the ninth aspect thereof, and provides an apparatus wherein the hold member comprises a heat generating member and a body, the heat generating member being made of an electrically-conductive ceramic, the body surrounding the heat generating member, the body being made of an insulating ceramic.

A fourteenth aspect of this invention is based on the ninth aspect thereof, and provides an apparatus wherein an inner surface of the die set comprises means for facilitating cooling of a first region of the molten resin in the cavity relative to cooling of a second region of the molten resin in the cavity, the die-set inner surface being exposed in the cavity, the second region adjoining the hold member, the first region being more distant from the hold member than the first region is.

A fifteenth aspect of this invention is based on the fourteenth aspect thereof, and provides an apparatus wherein the first region is thinner than the second region.

A sixteenth aspect of this invention is based on the ninth aspect thereof, and provides an apparatus wherein the heating means comprises means for heating the hold member to a temperature equal to or higher than a melting point of the injected resin.

A seventeenth aspect of this invention provides an apparatus for forming an insert-containing casting which comprises a die set having a cavity; a hold member movably provided on the die set for holding an insert in the cavity; means for injecting molten resin into the cavity when the insert is held by the hold member; means for separating the hold member from the insert at a given timing; and means for cooling a first region of the molten resin in the cavity at a rate greater than a rate of cooling of a second region of the molten resin in the cavity, the second region adjoining the hold member, the first region being more distant from the hold member than the second region is.

An eighteenth aspect of this invention is based on the seventeenth aspect thereof, and provides an apparatus wherein the first region is thinner than the second region.

BRIEF DESCRIPTION OF THE DRAWINGS

FIG. 19 is a diagram of the relation among samples of a hold pin and evaluation items.

DESCRIPTION OF THE PREFERRED EMBODIMENTS

First Embodiment

Figure 1:
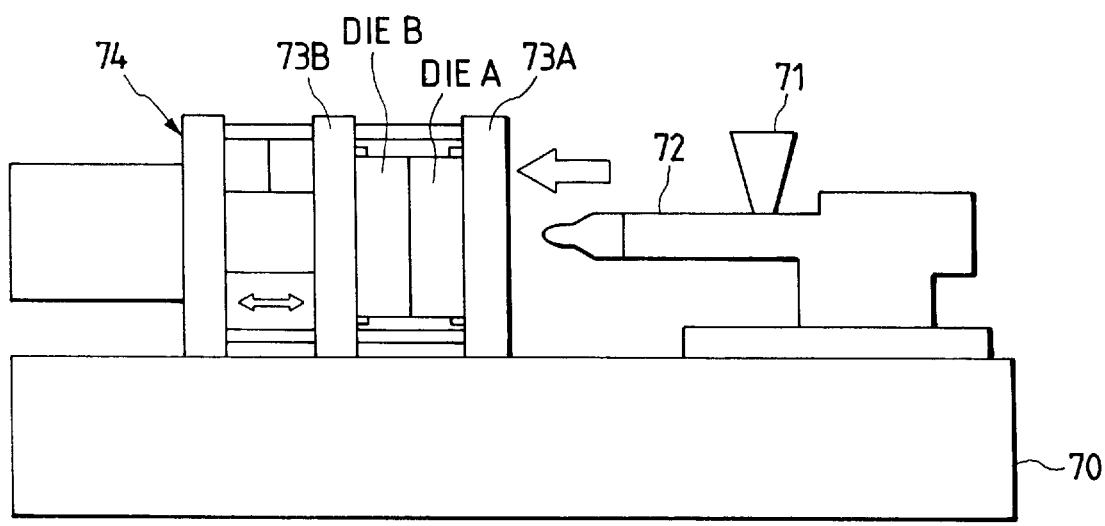
FIG. 1 is a front view of an injection molding machine according to a first embodiment of this invention.

With reference to FIG. 1, an injection molding machine includes a base 70 on which an injection portion and a molding portion are placed. The injection portion serves to inject molten resin into the molding portion. The molding portion serves to cool and solidify the molten resin fed from the injection portion. The injection portion (71, 72) moves along a direction denoted by the arrow in FIG. 1, and injects molten resin into a cavity within dies in the molding portion.

The injection portion includes a hopper 71 and an injection device 72. The hopper 71 contains pellets of resin. The hopper 71 feeds pellets of resin to the injection device 72. The injection device 72 makes the fed pellets of resin into molten resin.

After pellets of resin are fed to the injection device 72, they are driven toward an end of the injection device 72 by a screw (not shown) provided therein. The injection device 72 is provided with a heater (not shown) for heating the pellets of resin. While the pellets of resin are driven toward the end of the injection device 72, they are heated and molten by the heater and also the shear by the screw.

The molding portion includes a pair of dies (that is, a die "A" and a die "B"), die attachment plates 73A and 73B, and a drive device 74. The die "A" and the die "B" are retained by the die attachment plates 73A and 73B respectively. The drive device 74 serves to move the attachment plate 73B and the die "B". Specifically, the drive device 74 moves the die "B" toward and away from the die "A" along directions denoted by the arrows in FIG. 1.

Figure 2:
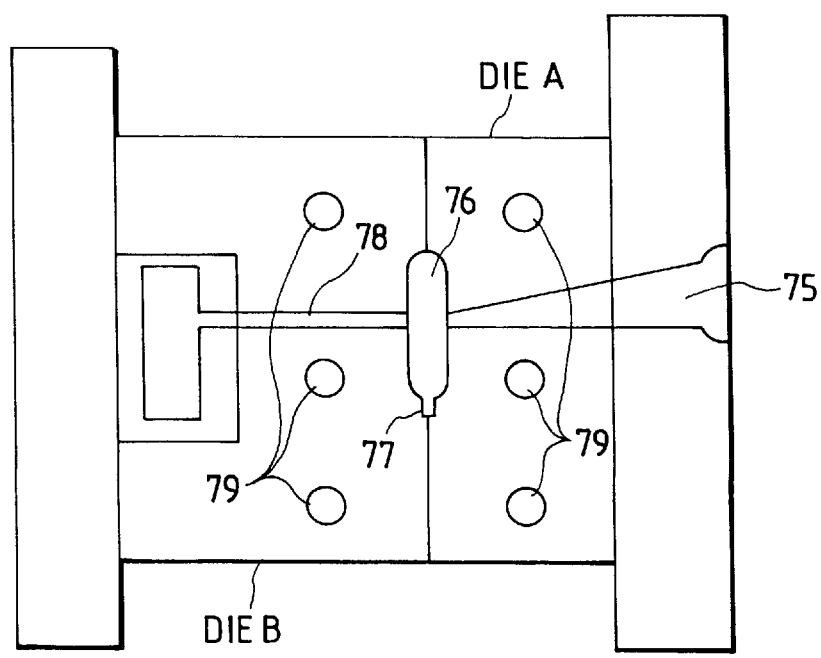
FIG. 2 is a diagram of a part of the injection molding machine in FIG. 1.

As shown in FIG. 2, the molding portion has a sprue 75 for introducing molten resin into a cavity 76 from the injection device 72 (see FIG. 1). An insert not shown in FIG. 2 is placed in the cavity 76. The molten resin enters the cavity 76 via a gate 77 after reaching an interior of the die "A" and "B". After the formation of a casting (a molding) which contains the insert is completed, the die "B" is separated from the die "A" by the drive device 74 (see FIG. 1). Accordingly, the final casting can be removed from the molding portion by an injector pin 78.

Figure 3:
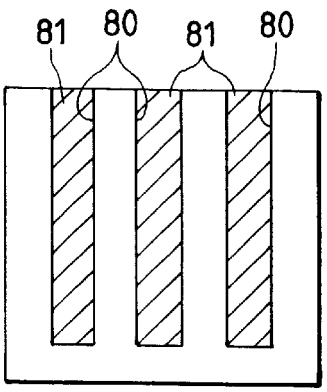
FIG. 3 is a sectional diagram of a die.

In general, heater portions 79 are provided in the die "A" and the die "B" for heating and holding the temperature of the whole of the die set to and at a given temperature. As shown in FIG. 3, each of the die "A" and the die "B" has holes 80 into which metal heaters 81 are inserted respectively. The metal heaters 81 constitute the heater portions 79 respectively.

Figure 4:
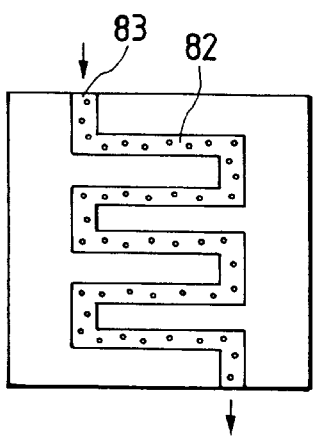
FIG. 4 is a sectional diagram of a die.

FIG. 4 shows another example of the heating arrangement for the die "A" and the die "B". In FIG. 4, each of the die "A" and the die "B" has a passage 83 through which heating medium 82 such as heated water or heated oil flows.

Figure 5:
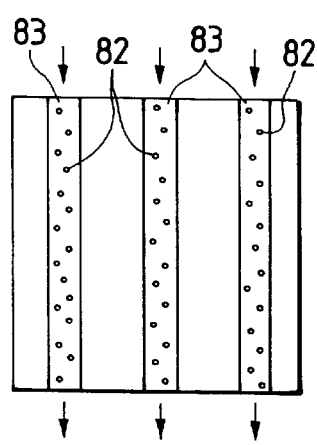
FIG. 5 is a sectional diagram of a die.

FIG. 5 shows still another example of the heating arrangement for the die "A" and the die "B". In FIG. 5, each of the die "A" and the die "B" has separate passages 83 through which heating medium 82 such as heated water or heated oil flows. The separate passages 83 may be modified so that they have a common inlet and a common outlet.

The die "A" and the die "B" may alternatively be cooled in the case of particular types of the injected resin. In this case, the arrangement of FIG. 4 or the arrangement of FIG. 5 is used, and the heating medium 82 is replaced by coolant such as cold water which flows through the passage or passages 83.

Figure 6:
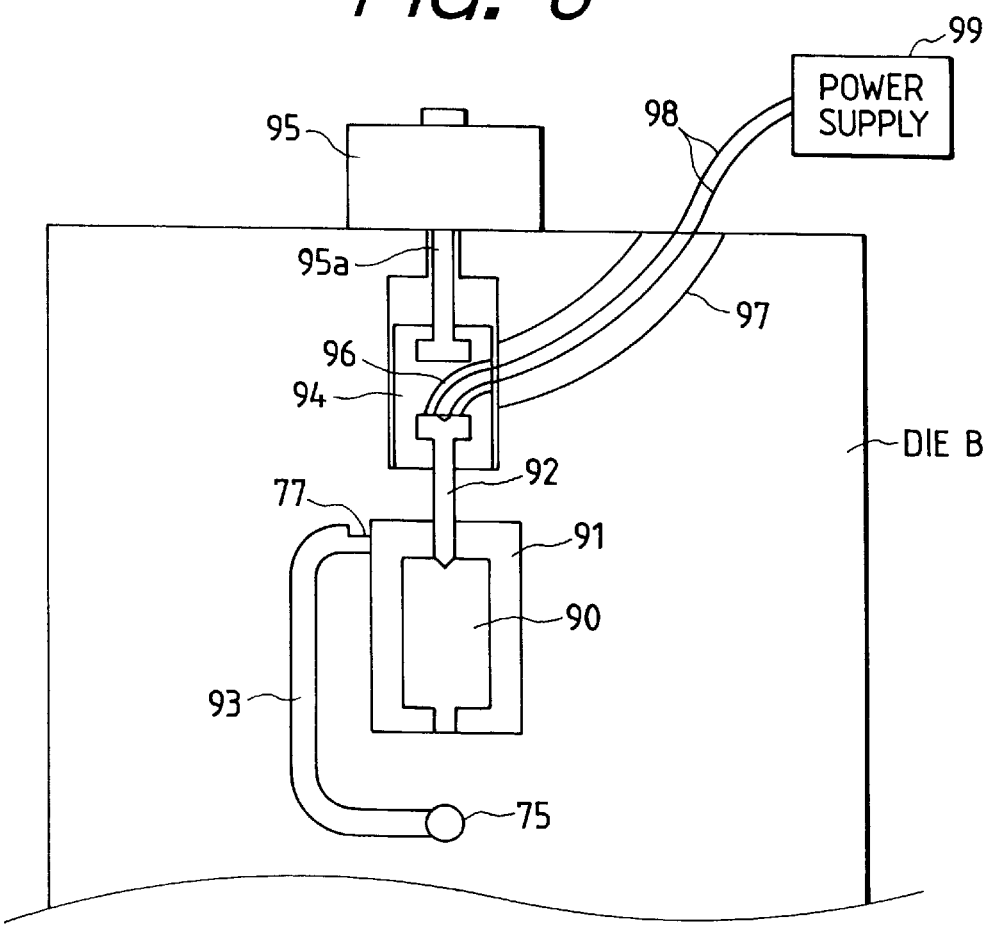
FIG. 6 is a plan view of a die in the injection molding machine in FIG. 1.

As shown in FIG. 6, the die "B" has a cavity portion 91 which forms a part of the cavity 76 (see FIG. 2) when the die "B" and the die "A" are in contact or engagement with each other. An insert 90 at least partially placed in the cavity portion 91 is supported by a hold pin 92.

In FIG. 6, a runner 93 extending between the sprue 75 and the gate 77 is a passage for transmitting molten resin from the sprue 75 to the gate 77. A casting resin (molding resin) remains in this passage as a runner. The runner is removed from the casting (the molding) before the casting is transferred to a next stage.

The hold pin 92 is connected to a cylinder pin 95a by a connecting member 94. The cylinder pin 95a is driven upward and downward by a pneumatic or hydraulic cylinder 95. As the cylinder pin 95a is driven upward and downward, the hold pin 92 moves into and from the cavity 76 (the cavity portion 91). The pneumatic or hydraulic cylinder 95 is a pneumatic or hydraulic actuator. The pneumatic cylinder 95 is also referred to as the air cylinder 95.

An electric current can be made to flow in a heater within the hold pin 92 to heat the latter. The connecting member 94 has a hole 96. The die "B" has a hole 97. The heater in the hold pin 92 is electrically connected to a power supply 99 by wiring lines 98 which extend through the hole 96 in the connecting member 94 and the hole 97 in the die "B". The power supply 99 is located outside the die "B".

Figure 7:
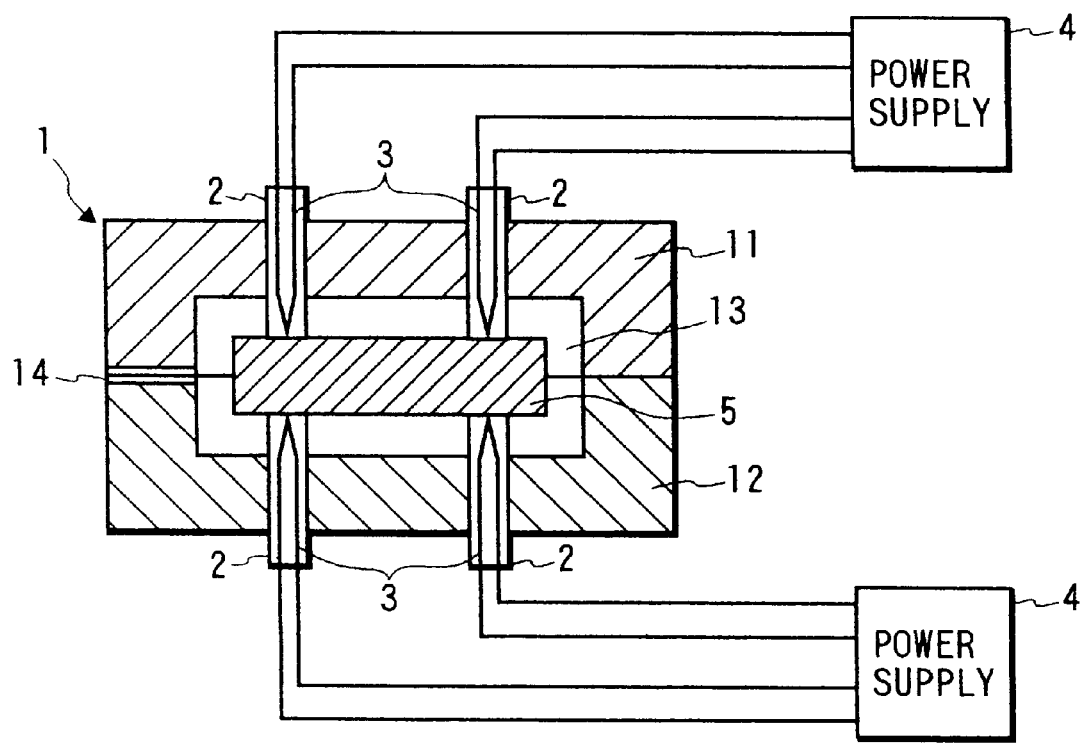
FIG. 7 is a sectional diagram of an apparatus for forming an insert-added casting (an insert-added molding) according to the first embodiment of this invention.

With reference to FIG. 7, an apparatus for forming an insert-added casting (an insert-added molding) includes a die set 1 having an upper die 11 and a lower die 12. Four hold pins (hold members) 2 are movably provided on the die set 1. A heating device (a heating means) includes electrically-powered heaters 3 for heating the hold pins 2, and power supplies 4 for feeding electric currents to the electrically-powered heaters 3.

The die set 1 is movable between a closed position and an open position. When the die set 1 assumes the closed position, the upper die 11 and the lower die 12 contact or engage each other.

When the die set 1 assumes the open position, the upper die 11 and the lower die 12 separate from each other. In the case where the die set 1 is in the closed position, the die set 1 has a cavity 13 formed by opposing surfaces of the upper die 11 and the lower die 12. The shape of the cavity 13 corresponds to the shape of a casting (a molding) to be formed. One side of the die set 1 has a gate 14 for transmitting molten resin into the cavity 13.

Two of the hold pins 2 are supported on the upper die 11 while the other two hold pins 2 are supported on the lower die 12.

The hold pins 2 are movable into and from the cavity 13. Each of the hold pins 2 is driven by an air cylinder (a pneumatic actuator) between first and second positions. It should be noted that the air cylinder corresponds to the pneumatic or hydraulic cylinder 95 in FIG. 6. The first positions of the hold pins 2 correspond to projected positions at which front ends of the hold pins 2 hold an insert 5 in the cavity 13. When the hold pins 2 assume the second positions, the front ends of the hold pins 2 are flash with the walls of the upper die 11 and the lower die 12. The second positions of the hold pins 2 are also referred to as the retracted positions.

Each of the electrically-powered heaters 3 includes, for example, a nichrome wire or a tungsten wire. The electrically-powered heaters 3 are embedded in the hold pins 2 respectively. Each of the electrically-powered heaters 3 is insulated from the walls of the related hold pin 2. The electrically-powered heaters 3 provided in the hold pins 2 related to the upper die 11 are electrically connected to one of the power supplies 4. The electrically-powered heaters 3 provided in the hold pins 2 related to the lower die 12 are electrically connected to the other power supply 4. It should be noted that the power supplies 4 may be replaced by a single power supply.

The apparatus of FIG. 7 forms an insert-added casting (an insert-added molding) as follows. Under conditions where the die set 1 is in the open position, the hold pins 2 are projected from the upper die 11 and the lower die 12. Then, an insert 5 is set in position within the die set 1, and the die set 1 is closed. As a result, the insert 5 is located at a given position in the cavity 13 while being supported by the front ends of the hold pins 2.

Figure 8:
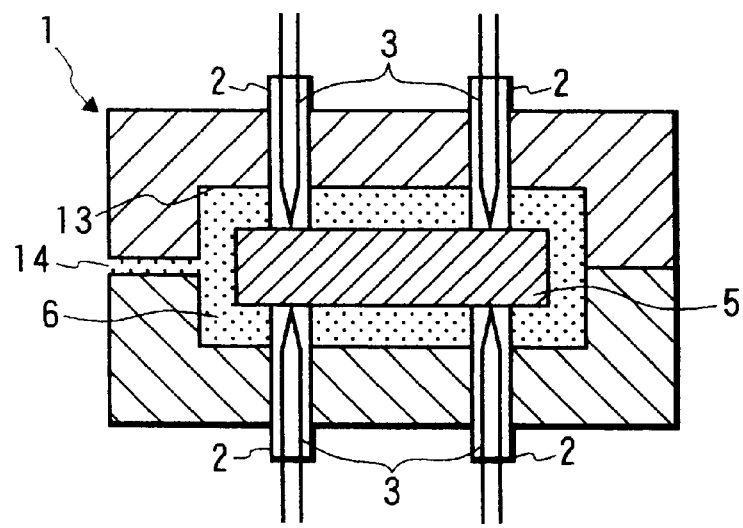
FIG. 8 is a sectional diagram of a die set in the apparatus of FIG. 7.

Subsequently, as shown in FIG. 8, the cavity 13 in the die set 1 is charged with molten resin 6 by an injection device. It should be noted that the injection device corresponds to the injection device 72 in FIG. 1. The molten resin 6 flows through the gate 14 before entering the cavity 13. At the same time, the power supplies 4 are activated so that electric currents are fed to the electrically-powered heaters 3. Thus, the hold pins 2 are heated to a given temperature higher than the melting point of the resin. During the charging of the cavity 13 with the molten resin 6, since the insert 5 is fixedly supported by the hold pins 2, the insert 5 is prevented from moving due to a pressure and a flow resistance provided by the molten resin 6. Since the hold pins 2 are heated at the given temperature higher than the melting point of the resin, the molten resin 6 does not form solidified layers when encountering the hold pins 2.

Figure 9:
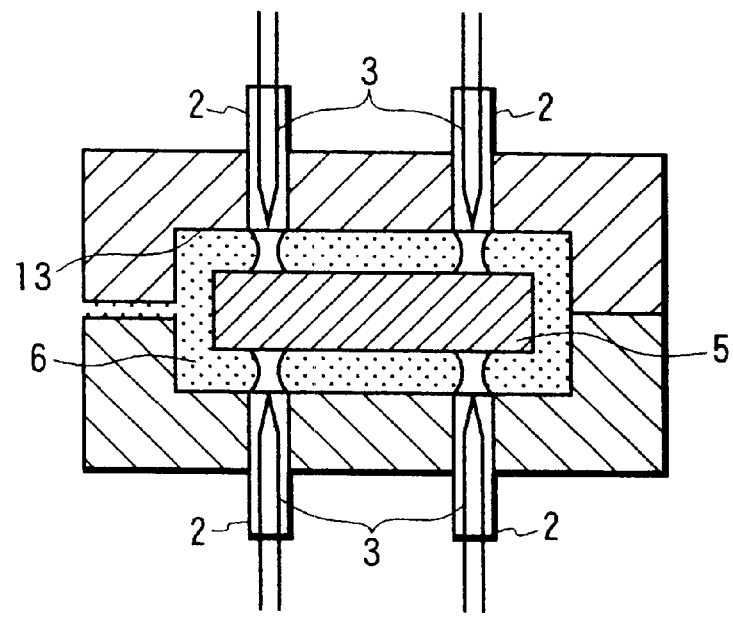
FIG. 9 is a sectional diagram of the die set in the apparatus of FIG. 7.
Figure 10:
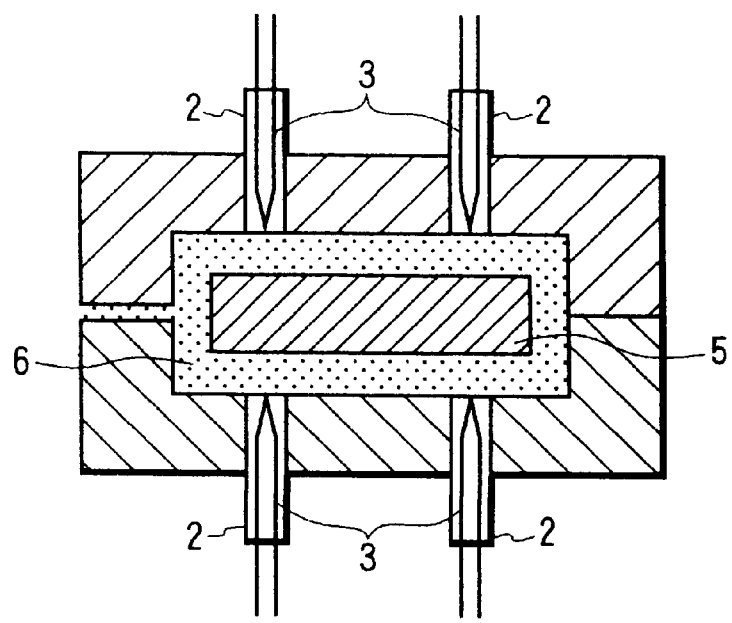
FIG. 10 is a sectional diagram of the die set in the apparatus of FIG. 7.

Then, the air cylinders are activated to move the hold pins 2 back from the cavity 13 to the retracted positions at which the front ends of the hold pins 2 are flush with the walls of the upper die 11 and the lower die 12 as shown in FIG. 9. At the same time, the cavity 13 is further charged with the molten resin 6. After the hold pins 2 reach the retracted positions, the electrically-powered heaters 3 are de-energized. As shown in FIGS. 9 and 10, the molten resin 6 smoothly enters and substantially fully occupies the spaces resulting from the backward movement of the hold pins 2. The portions of the molten resin 6 which occupy the spaces adequately fuse with the other portion of the molten resin 6. The spaces resulting from the backward movement of the hold pins 2 substantially completely disappear. Therefore, minute holes do not remain in the resin of a final casting. In addition, unfused portions of the resin do not occur. Finally, the molten resin 6 in the cavity 13 is cooled and solidified to complete a casting (a molding) which contains the insert 5 entirely sealed in the resin. The completed casting is good in waterproofness.

It is preferable that the hold pins 2 start to be moved back from the cavity 13 immediately after the charging of the cavity 13 with the molten resin 6 is completed. It should be noted that the hold pins 2 may start to be moved back from the cavity 13 before the charging of the cavity 13 with the molten resin 6 is completed. Here, the completion of the charging corresponds to conditions where about 90–95% of a space in the cavity 13 has been charged with the molten resin 6 and has then further be charged therewith while the injection pressure to the molten resin 6 is dropped to and maintained at a low level.

The timing of the start of the backward movement of the hold pins 2 may be controlled as follows. A first example uses a timer which starts the backward movement of the hold pins 2 at a moment a given time after the start of the charging of the cavity 13 with the molten resin 6. According to a second example, the pressure of the molten resin 6 in the cavity 13 is detected by a sensor, and a decision is made as to whether or not the charging of the cavity 13 with the molten resin 6 is completed by referring to the output signal of the sensor. In this case, the hold pins 2 start to be moved back from the cavity 13 after the output signal of the sensor indicates the completion of the charging of the cavity 13 with the molten resin 6.

Figure 11:
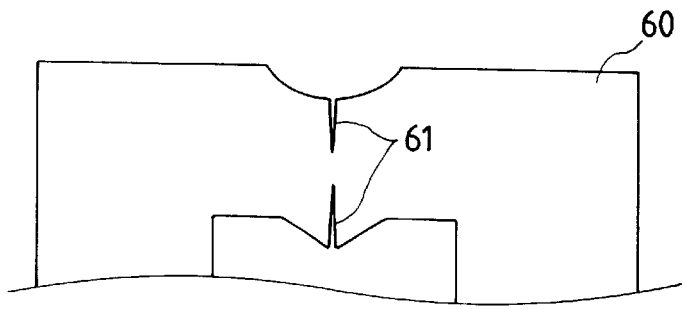
FIG. 11 is a sectional view of a resin member in a casting (a molding) formed by a prior-art method.

As shown in FIG. 11, a resin member 60 in a casting (a molding) formed by a prior-art method has unfused portions (minute holes) 61. The walls of the resin member 60 are considerably thin at positions corresponding to the unfused portions (the minute holes) 61. The thin walls reduce the reliability of the casting. In some cases, an unfused portion (a minute hole) 61 extends through the walls of the resin member 60.

Figure 12:
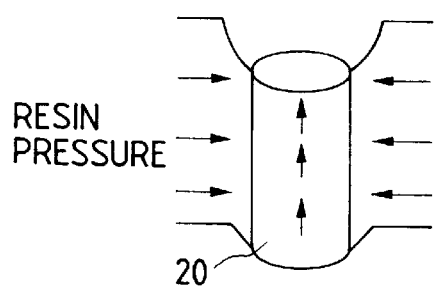
FIG. 12 is a perspective diagram of resin and a space in a cavity.
Figure 13:
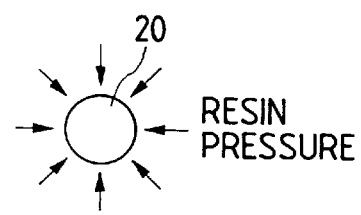
FIG. 13 is a sectional diagram of the resin and the space in FIG. 12.
Figure 14:
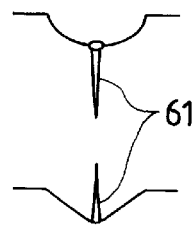
FIG. 14 is a sectional diagram of prior-art solidified resin.
Figure 15:
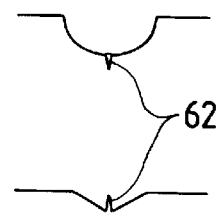
FIG. 15 is a sectional diagram of solidified resin in the first embodiment of this invention.

FIGS. 12 and 13 show an example of an opening (a space) 20 in molten resin which results from backward movement of a hold pin. As shown in FIGS. 12 and 13, a portion of the molten resin around the opening 20 is subjected to pressures directed toward the opening 20. Therefore, the molten resin advances into the opening 20 in all directions so that the opening 20 is contracted. According to a prior-art method in which hold pins are not heated, relatively great unfused portions (relatively great openings) 61 remain in solidified resin as shown in FIG. 14. According to the first embodiment of this invention, even under bad conditions, only small unfused portions (only small openings) or negligible unfused portions (negligible openings) 62 remain in solidified resin as shown in FIG. 15. According to the first embodiment of this invention, unfused portions (minute holes) are prevented from occurring in solidified resin in the case where the timing of the start of the backward movement of the hold pins 2 is relatively early with respect to the moment of the completion of the charging of the cavity 13, or in the case where the temperature of the heated hold pins 2 is sufficiently high.

Figure 16:
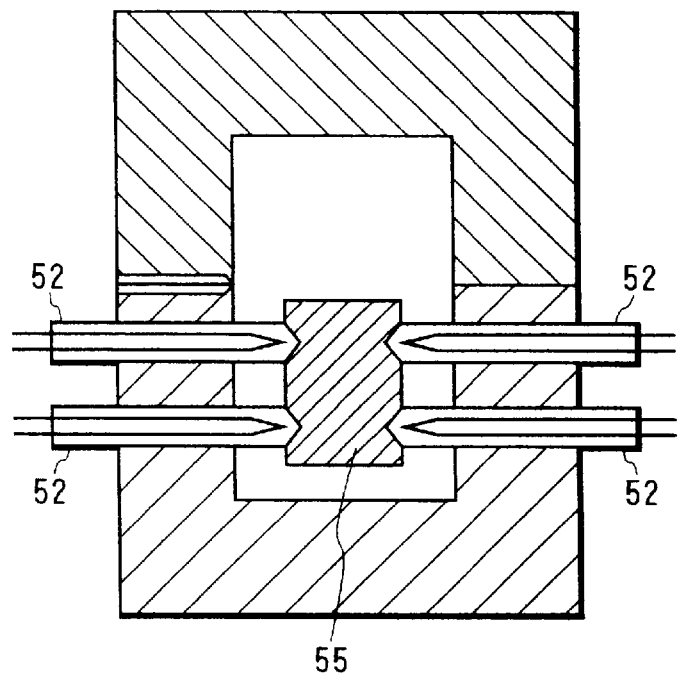
FIG. 16 is a sectional diagram of an apparatus for forming an insert-added casting (an insert-added molding) according to a modification of the first embodiment of this invention.

FIG. 16 shows a modification of the first embodiment of this invention. With reference to FIG. 16, an insert 55 is previously provided with recesses or grooves, and front ends of hold pins 52 conform to the recesses. During the formation of a casting (a molding), the front ends of the hold pins 52 fit into the recesses in the insert 55 respectively. This design enables the insert 55 to be accurately located in position. The shapes of the recesses in the insert 55 and the shapes of the front ends of the hold pins 52 are wedged, conical, or hemispherical.

Figure 17:
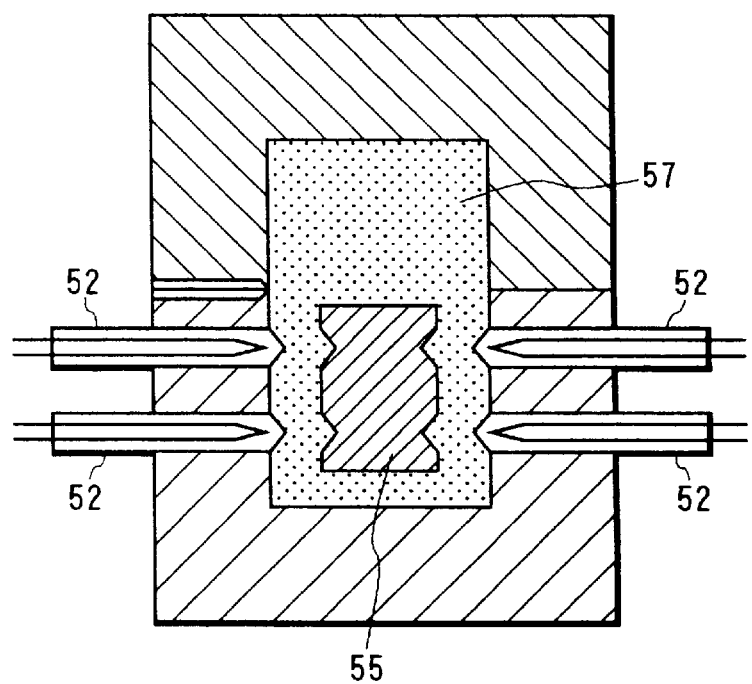
FIGS. 17 and 18 are sectional diagrams of the apparatus of FIG. 16 in different states respectively.
Figure 18:
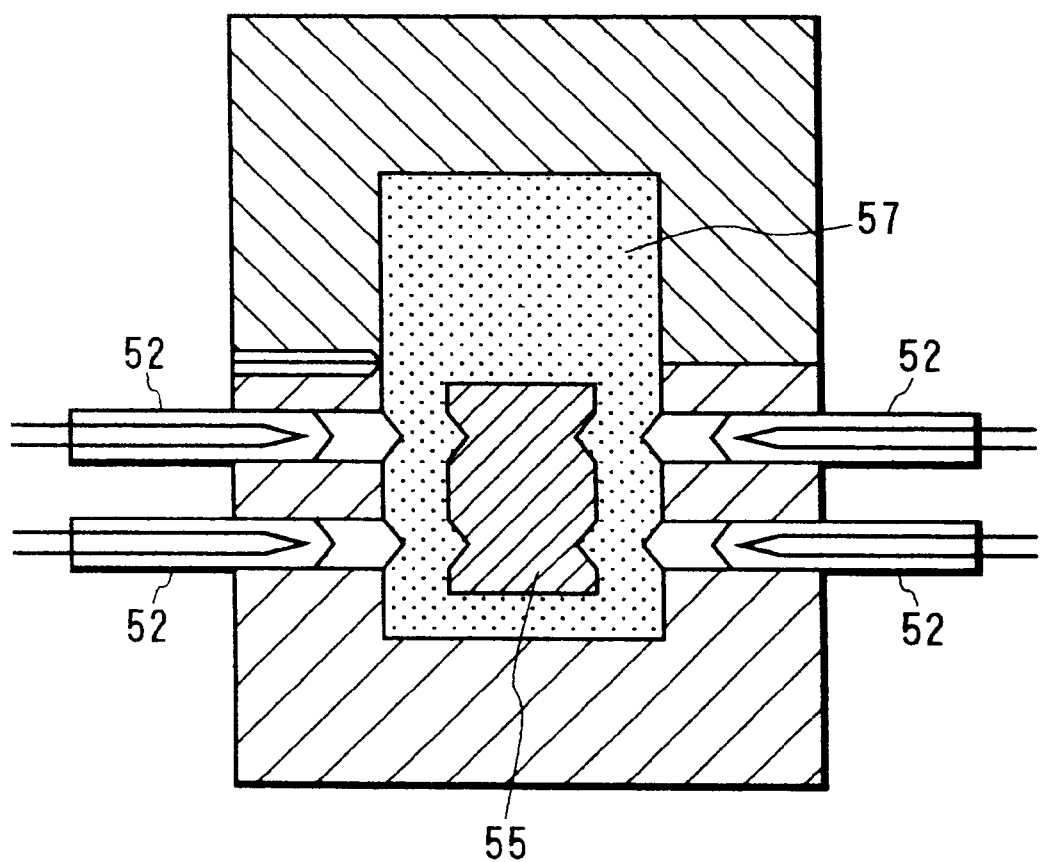

In FIG. 16, the direction of movement of a die set is not parallel with the directions of movement of the hold pins 52. A retracted position of each of the hold pins 52 preferably corresponds to a position where an end of the hold pin 52 is located immediately forward of inner surfaces of the walls of the die set as shown in FIG. 17. This design prevents the formation of projections on a resin member in a casting (a molding). As shown in FIG. 17, molten resin 57 occupies a cavity in the die set. The molten resin 57 is solidified. Subsequently, the hold pins 52 are further moved back from the retracted positions as shown in FIG. 18, and the die set is opened to allow the removal of the casting (the molding) therefrom.

In the case where heating the hold pins 2 does not adversely affect the die set 1 and the final casting (the final molding), for example, in the case where the die set 1 is large in size and is hardly heated or the number of the hold pins 2 is small so that the quantity of heat emitted from the hold pins 2 is small, the hold pins 2 may continue to be heated even after the backward movement of the hold pins 2.

In the case where the insert 5 is made of material (for example, resin) which has a low heat-resisting-ability, it is preferable that the hold pins 2 are quickly heated immediately before or immediately after the cavity 13 is charged with the molten resin 6. Thus, in this case, it is possible to shorten the time during which the high-temperature hold pins 2 remain in contact with the insert 5. To enable the quickly heating, it is preferable to locate the electrically-powered heaters 3 in portions of the hold pins 2 which are exposed in the cavity 13 when the hold pins 2 assume the projected positions. In addition, it is preferable to increase the density of an electric current flowing through each of the electrically-powered heaters 3. The electrically-powered heaters 3 may be bare ceramic heaters conforming to the hold pins 2.

To find a material suited for the electrically-powered heaters 3, samples "A", "B", "C", and "D" of a hold pin 2 were prepared, and were evaluated in items as shown FIG. 19. The samples "A", "B", "C", and "D" of the hold pin 2 were different from each other in material of the body of the hold pin 2 and material of the electrically-powered heater 3. The evaluation items were suitably set on the basis of a formation step model diagram, that is, FIG. 20 showing the relation between a time elapsed and a variation in the temperature of the hold pin 2.

Figure 20:
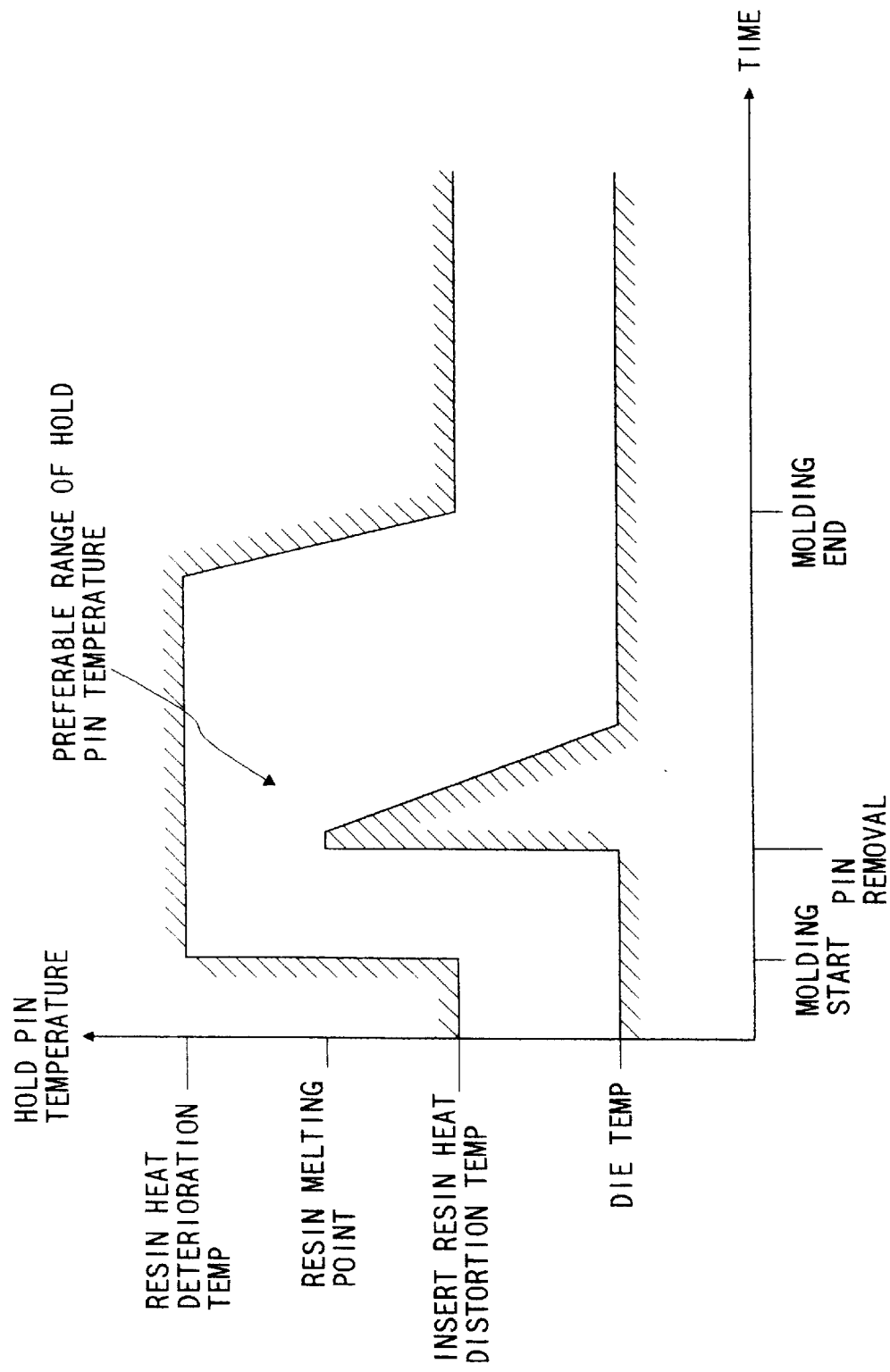
FIG. 20 is a time-domain diagram of the temperature of a hold pin.

In FIG. 20, the lower limit of the temperature of the hold pins 2 is preferably such that the temperature of the resin around the hold pins 2 is equal to or higher than the melting point of the resin when the hold pins 2 start to be moved back from the cavity 13. Generally, the temperature of the die set 1 is chosen so as to solidify the molten resin 6 injected into the cavity 13. Thus, the temperature of the hold pins 2 is not adjusted to a point lower than the temperature of the die set 1.

During the interval from the moment of the start of the formation to the moment of the start of the charging of the cavity 13 with the molten resin 6, it is preferable to keep the temperature of the hold pins 2 equal to or lower than the thermal deformation point of the material of the insert. When the hold pins 12 start to be moved back from the cavity 13, it is preferable to set the temperature of the hold pins 2 equal to or lower than the thermal deterioration point of the resin. Here, the thermal deterioration temperature means a temperature above which the chemical structure of the related material changes so that the physical properties thereof also change. Before the formation is completed (before the die set 1 is opened and after the charging of the cavity 13 with the molten resin 6 is completed), it is preferable to set the temperature of the hold pins 2 in a given range where the solidified resin is not deformed. This design is advantageous in preventing the resin in contact with the end of each of the hold pins 2 from being extended and shaped into a line according to the movement of the hold pin 2 during the removal of the casting (the molding).

With reference to FIG. 20, in the case where the insert remains supported by the hold pins 2 for only a short time, a high rate of the increase in the temperature is preferable. In view of the formation cycle, a high rate of the drop in the temperature is preferable. The other evaluation items are the rate of the electric power consumption by the electrically-powered heaters 3, and the reliability of the repetitive on-off operation of the electrically-powered heaters 3.

Figure 21:
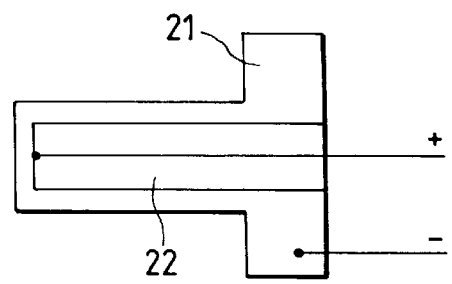
FIG. 21 is a sectional diagram of a hold pin.

In the sample "A" of the hold pin 2, the body of the hold pin 2 was made of a stainless steel (SUS304 according to the JIS standards), and the heating member of the electrically-powered heater 3 was made of the same stainless steel. In the sample "A" of the hold pin 2, as shown in FIG. 21, the body 21 of the hold pin 2 had thin walls, and the body 21 was used as the heating member. In addition, a plus-side wiring line extended into the body 21 of the hold pin 2 and was brazed and connected to a front end of the body 21 thereof while a minus-side wiring line was connected to a rear end of the body 21 of the hold pin 2. The major part of the plus-side wiring line in the body 21 of the hold pin 2 was covered with insulating material (for example, silicone gel) 22 so as not to be short-circuited to the walls of the body 21 of the hold pin 2. The plus-side wiring line was made of, for example, nichrome or tungsten (W).

Figure 22:
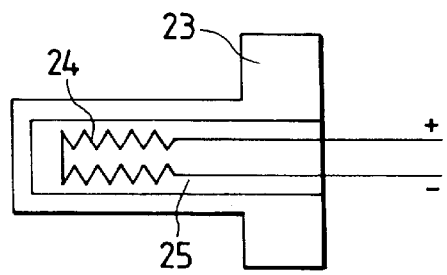
FIG. 22 is a sectional diagram of a hold pin.

As shown in FIG. 22, the sample "B" of the hold pin 2 had a body 23 provided with a hole in which a heating member 24 of the electrically-powered heater 3 was disposed. The body 23 of the hold pin 2 was made of a metal such as a high-speed steel, a steel SKH51 according to the JIS standards, or a steel SKD11 according to the JIS standards. The heating member 24 was made of tungsten (W). The heating member 24 was covered with insulating material 25.

Figure 23:
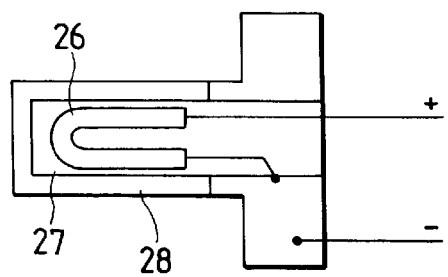
FIG. 23 is a sectional diagram of a hold pin.

As shown in FIG. 23, the sample "C" of the hold pin 2 had a body 27 provided with a hole in which a heating member 26 of the electrically-powered heater 3 was disposed. The body 27 of the hold pin 2 was made of insulating ceramics such as $Si_3N_4$. The heating member 26 was made of electrically-conductive ceramics such as $MoSi_2$. A metal cap 28 was provided on the body 27 of the hold pin 2.

Figure 24:
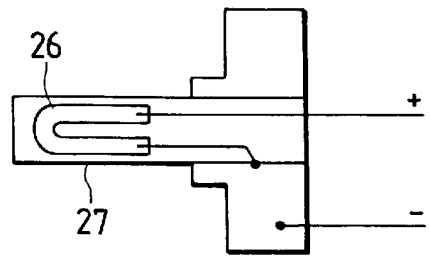
FIG. 24 is a sectional diagram of a hold pin.

As shown in FIG. 24, the sample "D" of the hold pin 2 had a body 27 provided with a hole in which a heating member 26 of the electrically-powered heater 3 was disposed. The body 27 of the hold pin 2 was made of insulating ceramics such as $Si_3N_4$. The heating member 26 was made of electrically-conductive ceramics such as $MoSi_2$. The outer surfaces of the body 27 of the hold pin 2 were exposed.

Under the temperature conditions of FIG. 20, the samples "A", "B", "C", and "D" of the hold pin 2 were tested regarding the temperature increase rate (the temperature increase speed), the electric power consumption rate, the strength, and the reliability of the repetitive on-off operation. The temperature increase rate (the temperature increase speed) was measured by using a thermistor or a temperature sensor located near the front end of each of the samples "A", "B", "C", and "D". The electric power consumption rate was measured during several times of the execution of the formation cycle in connection with each of the samples "A", "B", "C", and "D". The strength was expressed in a diameter of the hold pin 2 which provided a reference strength or more regarding each of the samples "A", "B", "C", and "D". The reliability of the repetitive on-off operation was measured by checking whether or not the hold pin 2 was broken after the hold pin 2 was subjected to several times of the on-off operation in connection with each of the samples "A", "B", "C", and "D".

As shown in FIG. 19, the samples "C" and "D" of the hold pin 2 were better than the samples "A" and "B" of the hold pin 2 in all the evaluation items. The sample "D" of the hold pin 2 was better than the sample "C" of the hold pin 2 in the temperature increase rate. The sample "C" of the hold pin 2 was similar to the sample "D" of the hold pin 2 except that the metal cap 28 was additionally provided (see FIG. 23). The samples "C" and "D" of the hold pin 2 were equal in the strength.

Regarding the sample "A" of the hold pin 2 (see FIG. 21), since the body 21 of the hold pin 2 had thin walls to enable an effective heating process, the strength was low. The electric resistance provided by the sample "A" of the hold pin 2 was small so that the electric current flowing through the heating member was set great. Accordingly, the sample "A" of the hold pin 2 had a high electric power consumption rate. The plus-side wiring line was brazed to the front end of the body 21 of the hold pin 2. The major part of the plus-side wiring line in the body 21 of the hold pin 2 was covered with the insulating material 22. There was a difference in thermal expansion between the body 21 of the hold pin 2 and the insulating material 22. During the repetitive on-off operation of the sample "A" of the hold pin 2, the brazed connection between the plus-side wiring line and the body 21 of the hold pin 2 tended to be broken. Accordingly, the sample "A" of the hold pin 2 was lower than the samples "C" and "D" of the hold pin 2 in the reliability of the repetitive on-off operation.

The sample "B" of the hold pin 2 was slightly worse than the samples "C" and "D" of the hold pin 2 in the temperature increase rate and the electric power consumption rate. The sample "B" of the hold pin 2 was comparable to the samples "C" and "D" of the hold pin 2 in the strength and the reliability of the repetitive on-off operation.

It was experimentally found that all the structures of the samples "A", "B", "C", and "D" were suited for a hold pin 2 actually used in the apparatus for forming the casting (the molding). Generally, the samples "B", "C", and "D" of the hold pin 2 were better than the sample "A" of the hold pin 2. The sample "D" of the hold pin 2 was excellent in the temperature increase rate.

A conceivable reason why the sample "D" of the hold pin 2 was better than the samples "B" and "C" of the hold pin 2 in the temperature increase rate is as follows. The sample "D" of the hold pin 2 is substantially of a double-layer structure having the electrically-conductive ceramics and the insulating ceramics. On the other hand, each of the samples "B" and "C" of the hold pin 2 is of a triple-layer structure having the heating member, the insulating material covering the heating member, and the hold-pin body.

It is preferable that the structure of the hold pins 2 in the first embodiment of this invention is similar to the structure of the sample "A", "B", "C", or "D". In the case of the hold pins 2 corresponding to the sample "A", the bodies of the hold pins 2 may be made of a suitable metal other than the stainless steel. In the case of the hold pins 2 corresponding to the sample "B", the heating member 24 (see FIG. 22) may be made of platinum (Pt) or another substance instead of tungsten (W). Further, the hold-pin body 23 may include a stainless-steel member having a hole in which a heating member is disposed. In the case of the hold pins 2 corresponding to the sample "C" or the sample "D", the electrically-conductive ceramics may use $ZrO_2$—$Y_2O_3$ or $LaF_3$ instead of $MoSi_2$. Further, the insulating ceramics for the hold-pin body may use $Al_2O_3$, BeO, or MgO.

It should be noted that the ceramics in this description mean inorganic non-metallic materials made through heating processes.

The body of each of the hold pins 2 may be made of insulating ceramics while the heating member of each of the electrically-powered heaters 3 may be made of metal such as W or Pt.

In the case where the hold pins 2 are insulated in the die set 1, the hold pins 2 may be made of only electrically-conductive ceramics.

Figure 25:
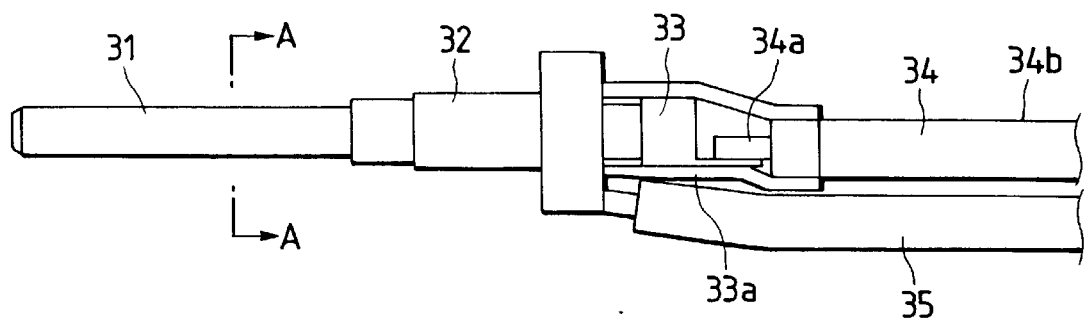
FIG. 25 is a side view of a hold pin.
Figure 26:
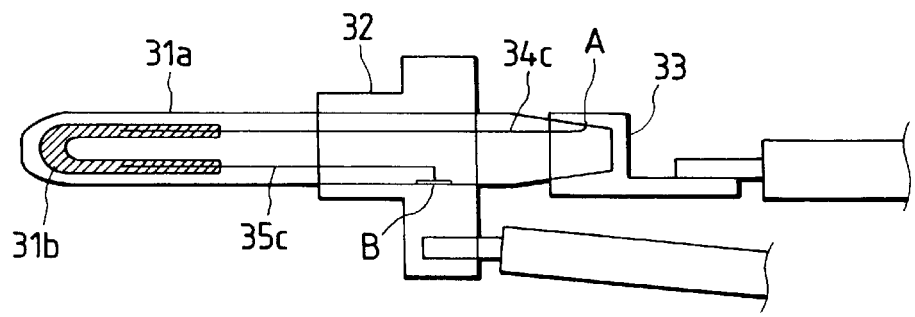
FIG. 26 is a sectional view of the hold pin in FIG. 25.
Figure 27:
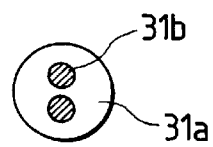
FIG. 27 is a sectional view of the hold pin taken along the line A—A in FIG. 25.

FIGS. 25, 26, and 27 show a hold pin similar in structure to the sample "D". The hold pin of FIGS. 25, 26, and 27 has a front end including a ceramic heater 31. The ceramics heater 31 is retained by a metal sleeve 32. The ceramics heater 31 extends through the metal sleeve 32. A rear end of the ceramics heater 31 is covered by a metal cap 33. A plus-side electric wire 34 is connected to a portion of the metal cap 33. The electric wire 34 has a metal conductor 34a, and an insulating coating 34b which covers the metal conductor 34a. The metal conductor 34a is made of, for example, copper. The metal conductor 34a has an uncovered portion brazed to the metal cap 33. A minus-side electric wire 35 is brazed to the metal sleeve 32. The metal cap 33 is covered by an insulating coating 33a which prevents the metal cap 33 from short-circuiting to the minus-side electric wire 35. When the hold pin of FIGS. 25, 26, and 27 is actually used in a die set, a front portion of the ceramics heater 31 projects into a cavity with the die set.

As shown in FIG. 27, the ceramics heater 31 has a heating member 31b made of electrically-conductive ceramics which is covered by insulating ceramics 31a. A plus-side wiring line 34c extending from the heating member 31b is connected to the metal cap 33 at a position denoted by "A" in FIG. 26. A minus-side wiring line 35c extending from the heating member 31b is connected to the metal sleeve 32 at a position denoted by "B" in FIG. 26.

It should be noted that the hold pin in FIGS. 25, 26, and 27 may be of another shape.

It is preferable that the heating of the hold pins 2 is suspended after the backward movement thereof is completed. This design may be modified as follows. In the case where the molten resin 6 tends to enter the clearances between the hold pins 2 and the die set 1 and to solidify, the hold pins 2 are re-heated during next movement of the hold pins 2. The re-heating of the hold pins 2 melts the solidified resin in the clearances between the hold pins 2 and the die set 1, enabling the subsequent movement of the hold pins 2.

As previously described, each of the hold pins 2 contains the heating member, and the hold pin 2 is directly heated by the heating member. This design may be modified into the following design. The die set 1 is provided with heaters of, for example, the electrically-powered type which surround the hold pins 2 respectively. In this case, the hold pins 2 are indirectly heated.

Each of the hold pins 2 may be of a hollow structure, and high-temperature fluid such as heated water, heated air, or heated oil may be fed to the interior of the hold pin 2 to heat the latter. In this case, the electrically-powered heaters 3 are omitted from the hold pins 2.

After the hold pins 2 are heated, the hold pins 2 naturally cool. Cooling devices may be provided around the hold pins 2 to expedite the formation cycle. For example, the die set 1 may be provided with passages near the hold pins 2, and coolant may be made to flow through the passages to cool the hold pins 2.

It is preferable that the hold pins 2 are heated to a temperature equal to or higher than the melting point of the resin. It should be noted that the hold pins 2 may be heated to a temperature below the melting point of the resin. It is preferable to heat the hold pins 2 to a temperature higher than the temperature of the die set 1.

A prior-art apparatus for forming a casting (a molding) will now be described. In the prior-art apparatus, hold pins are not positively heated, and the temperature of the hold pins is substantially equal to the temperature of a die set. The temperature of the die set is adjusted so that molten resin can be introduced into a cavity within the die set and can subsequently be solidified. Accordingly, the molten resin in the cavity is cooled by the hold pins as well as the die set. Thus, cooled and solidified resin layers occur around the hold pins. During the backward movement of the hold pins, the solidified resin layers prevent the molten resin from smoothly entering and occupying the spaces resulting from the backward movement of the hold pins. As a result, unfused portions or minute holes remain in the resin of the final casting (the final molding) formed by the prior-art apparatus.

In the first embodiment of this invention, the hold pins 2 may be heated to a temperature at which the solidified resin layers soften again. This design prevents the occurrence of unfused portions or minute holes in the resin of the final casting (the final molding). In this case, it is good that the hold pins 2 are heated to the deformation point of the resin.

The injected resin may be thermoplastic resin such as PBT (polybutylene terephthalate). The PBT resin has a melting point of 230° C. The PBT resin has a thermal deformation point of 150° C. When the PBT resin is used as the injected resin, it is preferable that the temperature of the die set 1 is set between 70° C. and 80° C. and the hold pins 2 are heated to about 100° C. It is though that, in this case, portions of the injected resin around the hold pins 2 are softer and hence unfused portions less remain in the resin of the final casting (the final molding) in comparison with a prior-art design where hold pins are not heated. The hold pins 2 may be heated to 150° C. which is equal to the thermal deformation point of the PBT resin. It is though that, in this case, portions of the injected resin around the hold pins 2 are sufficiently deformable and hence unfused portions are effectively prevented from remaining in the resin of the final casting (the final molding). Also, the hold pins 2 may be heated to a temperature equal to or higher than the melting point of the PBT resin. It is though that, in this case, portions of the injected resin around the hold pins 2 remain molten and hence unfused portions are more effectively prevented from remaining in the resin of the final casting (the final molding).

In the first embodiment of this invention, the insert 5 may be any electric component which is embedded in resin as a result of a molding process or a casting process. Regarding a resultant casting (a resultant molding), the insert 5 may be at least partially sealed in resin. In other words, a part of the insert 5 may be uncovered from the resin. Regarding the final casting, wiring lines or connectors for proving electrical connection between the insert 5 and an external device are exposed. The electric component corresponding to the insert 5 is, for example, an electric coil (an electric inductor), an IC, or a thermistor.

In the first embodiment of this invention, the die set 1 has the cavity 13 therein. The insert 5 is disposed in the cavity 13.

The shape of the cavity 13 corresponds to the shape of a casting (a molding) to be formed. The cavity 13 means a space in the die set 1 which corresponds to the final casting. The die set 1 is movable between the open position and the closed position. When the die set 1 is in the open position, the insert 5 can be placed in position with respect thereto or the final casting can be removed therefrom. A first example of the die set 1 has an upper die and a lower die which are relatively movable in vertical directions. A second example of the die set 1 has a fixed die and a movable die which can be moved relative to the fixed die in horizontal directions. It is preferable that the die set 1 is made of metal.

The hold pins 2 provided on the die set 1 serve to fixedly support the insert 5 in a given position within the cavity 13. The hold pins 2 are also referred to as the hold members. The hold members are movable into and from the cavity 13. The hold members are driven by drive devices such as hydraulic cylinders or air cylinders. It is preferable that the hold members are cylindrical. The hold members may have a shape of a square bar or an L-shaped configuration in conformity with the shape of the insert 5. When the hold members assume retracted positions, the front end surfaces of the hold members are substantially flush with or in positional agreement with the inner surfaces of the die set 1.

It is preferable that the hold members are made of a steel suited for dies. The hold members may be made of ceramic material which withstands high temperatures.

The die set 1 serves to cool and solidify the molten resin injected into the cavity 13. The hold members may be heated by heating devices corresponding to the electrically-powered heaters 3. The heated hold members prevent the solidification of the molten resin therearound, or change the solidified resin toward the molten state.

The degree of the heating of the hold members by the heating devices is preferably chosen so that the resin around the hold members will remain molten. In the case where the hold members are heated to a temperature higher than the temperature of the inner surfaces of the die set 1, it is possible to suppress the occurrence of unfused portions (minute holes) in the resin of the final casting. It is preferable to heat the hold members to a temperature equal to or higher than the melting point of the resin and equal to or lower than the thermal deterioration point of the resin. The heating devices may be the electrically-powered heaters 3 each including a nichrome wire, a tungsten wire, a platinum wire, or an electrically-conductive ceramic member. It is preferable to place the electrically-powered heaters 3 in the hold members. The electrically-powered heaters 3 may be located outside the hold members. The power supplies 4 for the electrically-powered heaters 3 are, for example, switching power supplies or other power supplies which can feed great constant currents. One power supply 4 may be used per hold member. Alternatively, one power supply 4 may be used per two or more hold members.

In the first embodiment of this invention, it is preferable to use two or more hold members. It should be noted that only one hold member may be provided.

It is preferable that the injected resin is of the thermoplastic type. Examples of the used thermoplastic resin are PBT (polybutylene terephthalate) resin, PPS (polyphenylene sulfide) resin, polyamide-based resin, and polyester-based resin.

Second Embodiment

Figure 28:
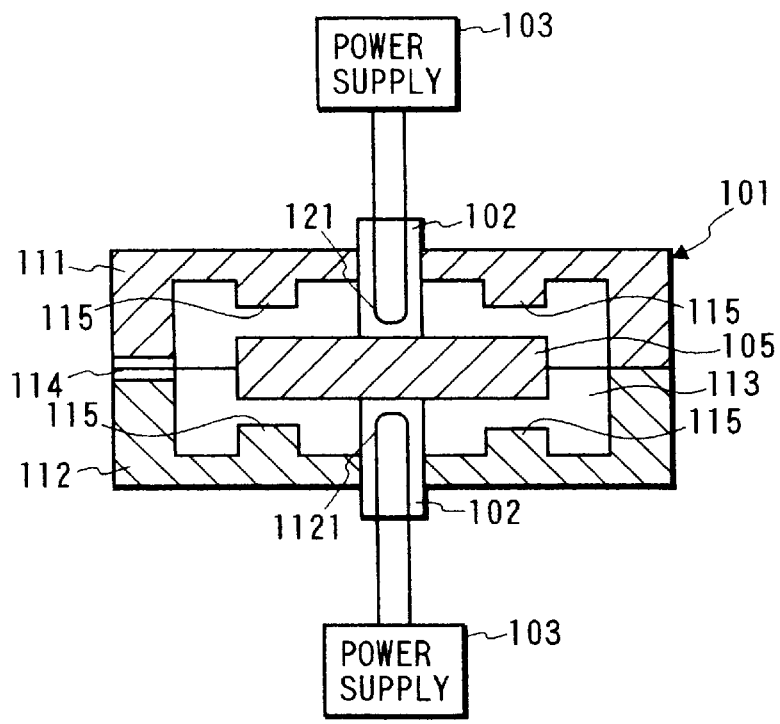
FIG. 28 is a sectional diagram of an apparatus for forming an insert-added casting (an insert-added molding) according to a second embodiment of this invention.

With reference to FIG. 28, an apparatus for forming an insert-added casting (an insert-added molding) includes a die set 101 having an upper die 111 and a lower die 112. The die set 101 has thin-wall forming portions 115. Two hold pins (hold members) 102 are movably provided on the die set 101. Each of the hold pins 102 has a heating device (a heating means).

The die set 101 is movable between a closed position and an open position. When the die set 101 assumes the closed position, the upper die 111 and the lower die 112 contact or engage each other. When the die set 101 assumes the open position, the upper die 111 and the lower die 112 separate from each other. In the case where the die set 101 is in the closed position, the die set 101 has a cavity 113 formed by opposing surfaces of the upper die 111 and the lower die 112. The shape of the cavity 113 corresponds to the shape of a casting (a molding) to be formed. One side of the die set 101 has a gate 114 for transmitting molten resin into the cavity 113.

The inner surfaces of the upper die 111 and the lower die 112 which define the cavity 113 are provided with projections corresponding to the thin-wall forming portions 115 respectively. The thin-wall forming portions 115 correspond in position to both ends of an insert 105 disposed in the cavity 113. The thin-wall forming portions 115 of the upper die 111 oppose the thin-wall forming portions 115 of the lower die 112 respectively. Ends of the thin-wall forming portions 115 are located near the insert 105. The ends of the thin-wall forming portions 115 are spaced from the insert 105 by a gap of, for example, about 1 mm. On the other hand, the inner surfaces of the die set 101 except the thin-wall forming portions 115 are spaced from the insert 105 by a gap of, for example, about 4 mm. Accordingly, the thickness of portions of molten resin 106 between the thin-wall forming portions 115 and the insert 105 is smaller than the thickness of other portions of molten resin 106 by, for example, about 3 mm.

One of the hold pins 102 is supported on the upper die 111 while the other hold pin 102 is supported on the lower die 112. The hold pins 102 vertically extend through the walls of the central portions of the upper die 111 and the lower die 112 respectively. The hold pins 102 are movable into and from the cavity 113. Each of the hold pins 102 is driven by an air cylinder (a pneumatic actuator) between first and second positions. It should be noted that the air cylinder corresponds to the pneumatic or hydraulic cylinder 95 in FIG. 6. The first positions of the hold pins 102 correspond to projected positions at which front ends of the hold pins 102 hold the insert 105 in the cavity 113. When the hold pins 102 assume the second positions, the front ends of the hold pins 102 are flash with the walls of the upper die 111 and the lower die 112. The second positions of the hold pins 102 are also referred to as the retracted positions.

The hold pins 102 have bodies made of insulating ceramics in which electrically-powered heaters 121 are embedded respectively. The electrically-powered heaters 121 include heating members made of ceramics respectively. The electrically-powered heaters 121 are electrically connected to power supplies 103 respectively.

The apparatus of FIG. 28 forms an insert-added casting (an insert-added molding) as follows. Under conditions where the die set 101 is in the open position, the hold pins 102 are projected from the upper die 111 and the lower die 112. Then, an insert 105 is set in position within the die set 101, and the die set 101 is closed. As a result, the insert 105 is located at a given position in the cavity 113 while being supported by the front ends of the hold pins 102.

Figure 29:
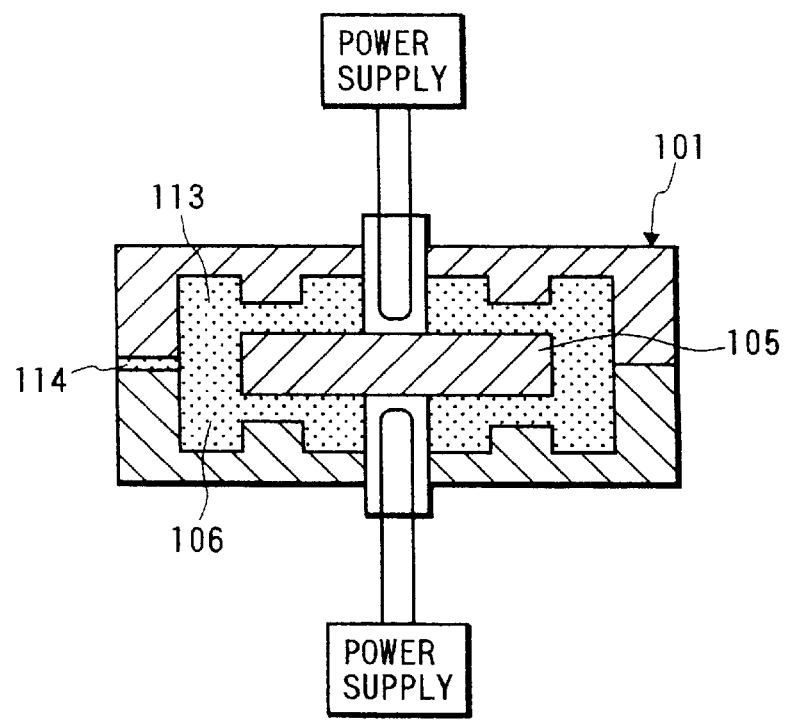
FIGS. 29, 30, and 31 are sectional diagrams of the apparatus of FIG. 28 in different states respectively.
Figure 30:
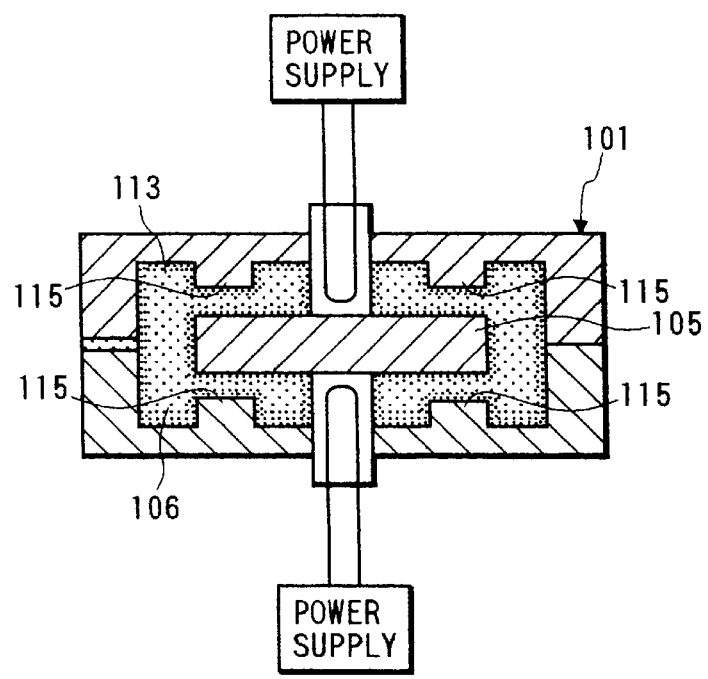

Subsequently, as shown in FIG. 29, the cavity 113 in the die set 101 is charged with molten resin 106 by an injection device. It should be noted that the injection device corresponds to the injection device 72 in FIG. 1. The molten resin 106 flows through the gate 114 before entering the cavity 113. At the same time, the power supplies 103 are activated so that electric currents are fed to the electrically-powered heaters 121. Thus, the hold pins 102 are heated to a given temperature higher than the melting point of the resin. During the charging of the cavity 113 with the molten resin 106, since the insert 105 is fixedly supported by the hold pins 102, the insert 105 is prevented from moving due to a pressure and a flow resistance provided by the molten resin 106. After a given time elapses, the cooling and the solidification of the molten resin 106 gradually advance from areas in contact with the die set 101 and the insert 105 as shown in FIG. 30. In the regions between the thin-wall forming portions 115 and the insert 105, the solidification of the molten resin 106 reaches a center in a short time since the thickness thereof is small. During a certain time after the moment of the completion of the solidification of the molten resin 106 in the regions between the thin-wall forming portions 115 and the insert 105, the resin which occupies centers of the other thick regions remains molten. Since the hold pins 102 are heated at the given temperature higher than the melting point of the resin, the molten resin 106 does not form solidified layers when encountering the hold pins 102.

Figure 31:
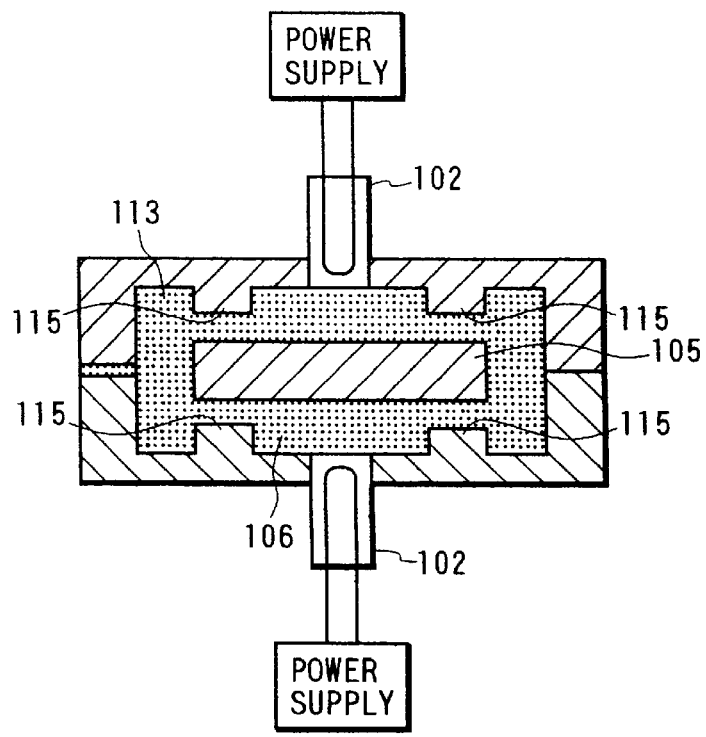

Then, the air cylinders are activated to move the hold pins 102 back from the cavity 113 to the retracted positions at which the front ends of the hold pins 102 are flush with the walls of the upper die 111 and the lower die 112 as shown in FIG. 31. At the same time, the cavity 113 is further charged with the molten resin 106. After the hold pins 102 reach the retracted positions, the electrically-powered heaters 121 are de-energized. As shown in FIG. 31, the molten resin 106 smoothly enters and substantially fully occupies the spaces resulting from the backward movement of the hold pins 102. The portions of the molten resin 106 which occupy the spaces adequately fuse with the other portion of the molten resin 106. The spaces resulting from the backward movement of the hold pins 2 substantially completely disappear. Therefore, minute holes do not remain in the resin of a final casting. In addition, unfused portions of the resin do not occur. While the molten resin 106 enters the spaces resulting from the backward movement of the hold pins 102, the insert 105 remains held by the solidified resin occupying the regions between the thin-wall forming portions 115 and the insert 105. Accordingly, it is possible to prevent displacement of the insert 105 from the desired position. Finally, the whole of the molten resin 106 in the cavity 113 is cooled and solidified to complete a casting (a molding) which contains the insert 105 entirely sealed in the resin. The completed casting is good in waterproofness.

Figure 32:
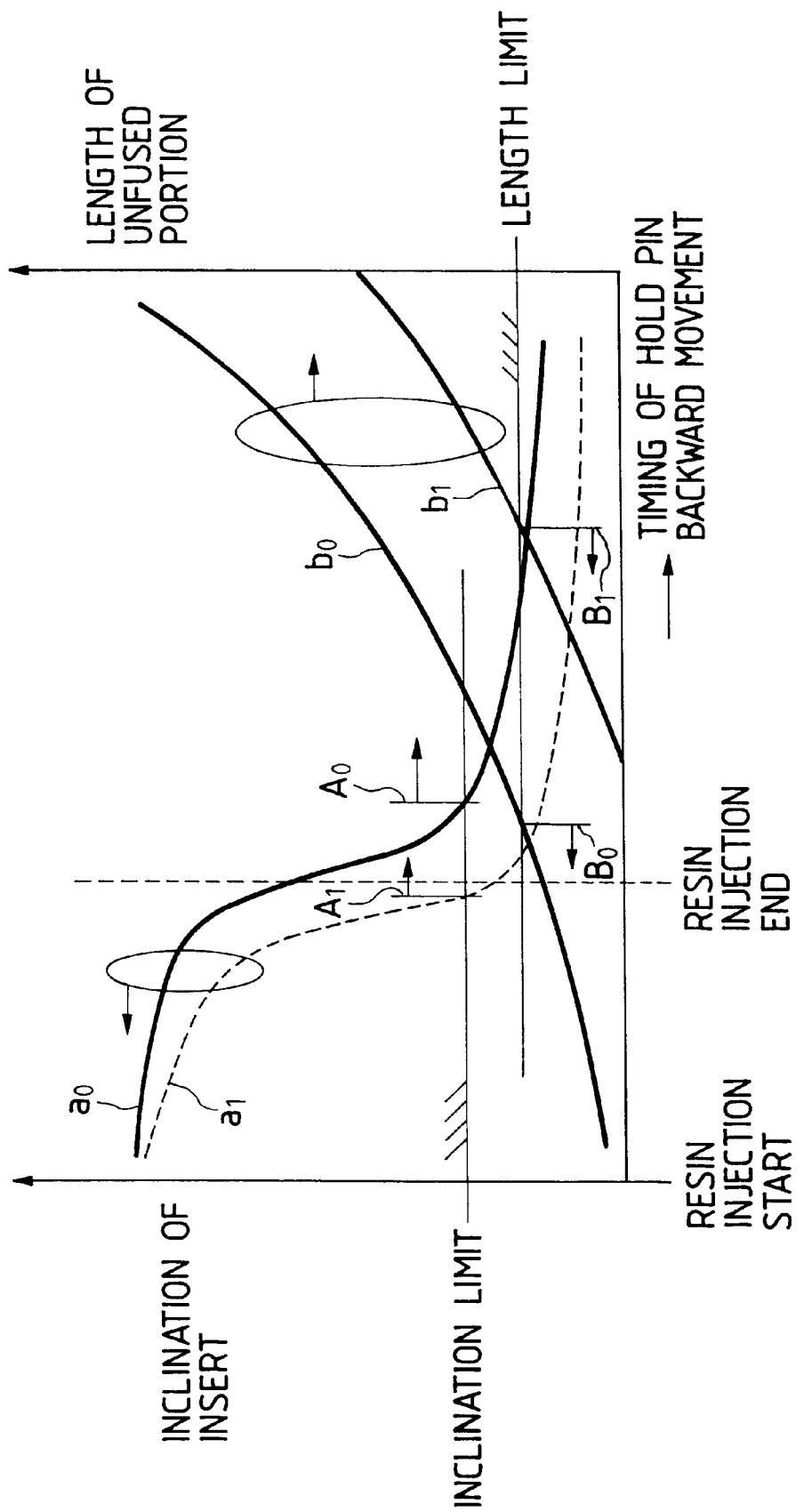
FIG. 32 is a diagram of the relation among the timing of backward movement of a hold pin, the inclination of an insert, and the length of an unfused portion (a minute hole).

According to a modification of the second embodiment of this invention, the hold pins 102 are not heated. In the absence of the thin-wall forming portions 115, the insert 105 tends to incline during the backward movement of the hold pins 102. Under some conditions, unfused portions (minute holes) tend to occur in the resin of the final casting (the final molding). As shown in FIG. 32, the inclination of the insert 105 depends on the timing of the backward movement of the hold pins 102. Also, the length of unfused portions (minute holes) in the resin of the final casting depends on the timing of the backward movement of the hold pins 102. In FIG. 32, the lines "a0" and "a1" denote the inclinations of the insert 105 while the lines "b0" and "b1" denote the lengths of unfused portions (minute holes) in the resin of the final casting.

The inclination "a0" of the insert 105 occurs in a prior-art apparatus which does not have the thin-wall forming portions 115. The inclination "a1" of the insert 105 occurs in the modification of the second embodiment of this invention which has the thin-wall forming portions 115.

The length "b0" of unfused portions (minute holes) in the resin of the final casting occurs in the modification of the second embodiment of this invention in which the hold pins 102 are not heated. The length "b1" of unfused portions (minute holes) in the resin of the final casting occurs in the second embodiment of this invention in which the hold pins 102 are heated.

As shown by the lines "a0" and "a1" in FIG. 32, the inclination of the insert 105 is great in the case where the hold pins 102 are moved backward immediately after the molten resin 106 starts to be injected into the die set 101. The inclination of the insert 105 abruptly decreases as the timing of the backward movement of the hold pins 102 is retarded to a moment immediately preceding the time of the completion of the injection of the molten resin 106. The decrease in the inclination of the insert 105 is caused by the fact that locating the insert 105 is implemented by charging the cavity 113 with the molten resin 106.

As shown by the lines "b0" and "b1" in FIG. 32, the length of unfused portions (minute holes) in the resin of the final casting increases in accordance with the retardation of the timing of the backward movement of the hold pins 102. The increase in the length of unfused portions (minute holes) is caused by the fact that the molten resin 106 around the hold pins 102 is more solidified as the timing of the backward movement of the hold pins 102 is retarded.

It is now assumed that, as shown in FIG. 32, the limit of the inclination of the insert 105 and the limit of the length of unfused portions (minute holes) are determined for an actual product. With reference to FIG. 32, in the case where the thin-wall forming portions 115 are not provided or the case where the hold pins 102 are not heated, it is preferable that the timing of the backward movement of the hold pins 102 follows "A0" which is decided by the limit of the inclination of the insert 105. Further, it is preferable that the timing of the backward movement of the hold pins 102 precedes "B0" which is decided by the limit of the length of unfused portions (minute holes). As understood from FIG. 32, the timing of the backward movement of the hold pins 102 is absent which meets the above-indicated two different conditions.

In the case where the thin-wall forming portions 115 are provided, the inclination of the insert 105 shifts from "a0" to "a1" so that an earlier timing "A1" of the backward movement of the hold pins 2 is provided in connection with the limit of the inclination of the insert 105. As understood from FIG. 32, in this case, there is a certain range of the timing of the backward movement of the hold pins 102 which meets the previously-indicated two different conditions. Thus, the inclination of the insert 105 can be lower than the limit while the timing of the backward movement of the hold pins 102 can be relatively advanced to shorten the length of unfused portions (minute holes).

As understood from the above description, the thin-wall forming portions 115 prevent unfused portions (minute holes) from remaining in the resin of the final casting. It is preferable to locate the thin-wall forming portions 115 in places distant from the hold pins 102. In this case, the thickness of the molten resin 106 near and around the hold pins 102 is relatively great while the thickness of the molten resin 106 between the thin-wall forming portions 115 and the insert 105 is relatively small. Thus, the molten resin 106 between the thin-wall forming portions 115 and the insert 105 is more quickly solidified than the molten resin 106 near and around the hold pins 102 is.

The case where the hold pins 102 are heated and moved backward is advantageous over the case where the hold pins 102 are moved backward without being heated in that the length of unfused portions (minute holes) can be short even when the timing of the backward movement of the hold pins 102 is retarded. With reference to FIG. 32, the length of unfused portions (minute holes) can shift from "b0" to "b1", and hence the length of unfused portions (minute holes) can be short even when the timing of the backward movement of the hold pins 102 is retarded. Accordingly, it is possible to retard the timing of the backward movement of the hold pins 102. Further, it is possible to prevent the insert 105 from excessively inclining.

As previously described, the thin-wall forming portions 115 enable an earlier timing of the backward movement of the hold pins 102. Thereby, it is possible to suppress the occurrence of unfused portions (minute holes) in the resin of the final casting. With reference to FIG. 32, it is preferable that the timing of the backward movement of the hold pins 102 resides in the range between "A1" and "B0".

The heating of the hold pins 102 makes it possible to suppress the occurrence of unfused portions (minute holes) in the resin of the final casting even when the timing of the backward movement of the hold pins 102 is retarded to prevent an excessive inclination of the insert 105. With reference to FIG. 32, it is preferable that the timing of the backward movement of the hold pins 102 resides in the range between "A0" and "B1".

In the case where the thin-wall forming portions 115 are provided and the hold pins 102 are heated, the inclination of the insert 105 can be effectively suppressed while the resin of the final casting is substantially void of unfused portions (minute holes). With reference to FIG. 32, it is preferable that the timing of the backward movement of the hold pins 102 resides in the range between "A1" and "B1".

As the gap between the thin-wall forming portions 115 of the die set 101 and the insert 105 decreases, the thickness of the molten resin 106 therein decreases so that the molten resin 106 therein is more quickly cooled and solidified. The quicker solidification of the molten resin 106 enhances the ability of fixing and holding the insert 105. When the gap between the thin-wall forming portions 115 and the insert 105 is excessively small, the cavity 113 within the die set 101 tends to be insufficiently charged with the molten resin 106. Accordingly, it is preferable that the gap between the thin-wall forming portions 115 and the insert 105 resides in the range of about 0.5 mm to about 1.5 mm. As the gap between the insert 105 and the inner surfaces of the die set 101 except the thin-wall forming portions 115 increases, the molten resin 106 more reliably enters and occupies the spaces resulting from the backward movement of the hold pins 102. On the other hand, as the gap between the insert 105 and the inner surfaces of the die set 101 except the thin-wall forming portions 115 increases, the formation cycle lengthens. Accordingly, it is preferable that the gap between the insert 105 and the inner surfaces of the die set 101 except the thin-wall forming portions 115 resides in the range of about 2 mm to about 6 mm.

It should be noted that the thin-wall forming portions 115 may be provided on the insert 105 rather than the die set 101. In this case, the wholes of the opposing inner surfaces of the upper die 111 and the lower die 112 may be flat.

Figure 33:
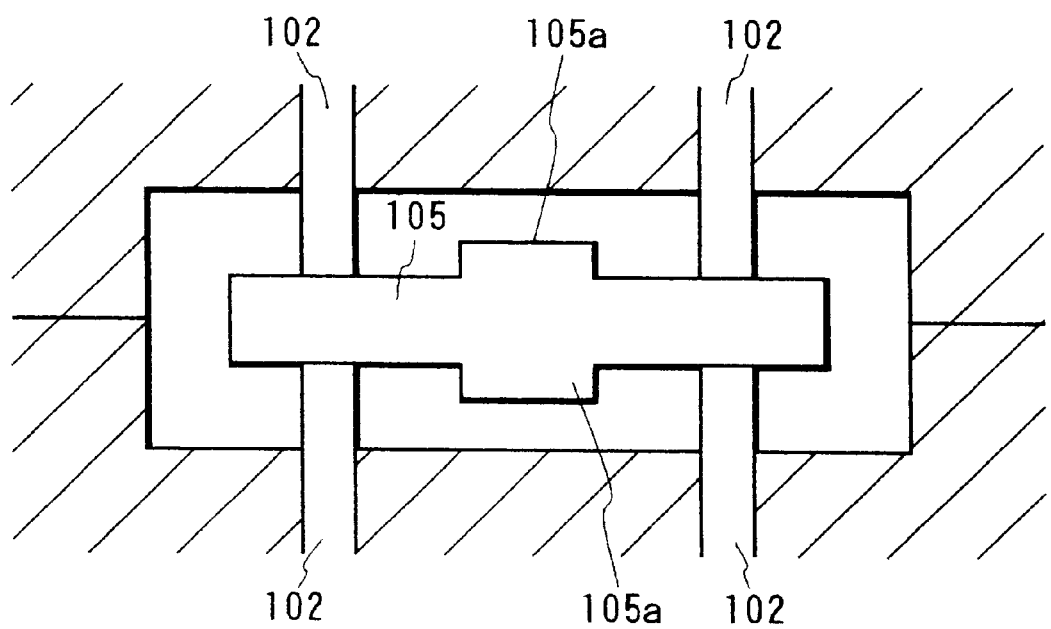
FIG. 33 is a sectional diagram of an apparatus for forming an insert-added casting (an insert-added molding) according to a modification of the second embodiment of this invention.

FIG. 33 shows a related modification of the second embodiment of this invention in which thin-wall forming portions 105a are provided on an insert 105 rather than a die set. The thickness of molten resin between the thin-wall forming portions 105a and the inner surfaces of the die set is smaller than the thickness of resin between the insert 105 except the thin-wall forming portions 105a and the inner surfaces of the die set. In this case, the die set may be provided with thin-wall forming portions.

It is preferable to suitably set the positions of the thin-wall forming portions 115 and the number of the thin-wall forming portions 115 in consideration of the shape and the size of the insert 105.

Figure 34:
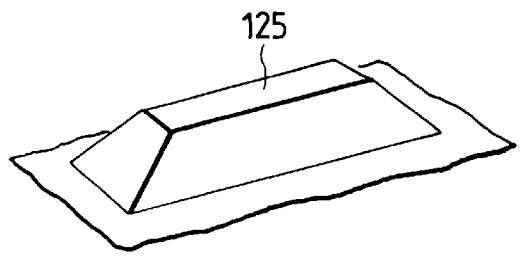
FIG. 34 is a perspective view of a thin-wall forming portion.
Figure 35:
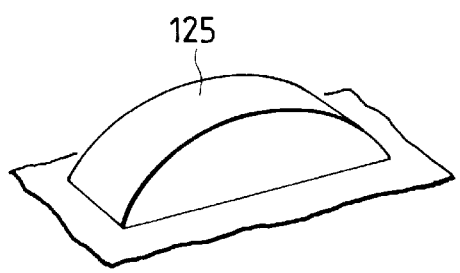
FIG. 35 is a perspective view of a thin-wall forming portion.
Figure 36:
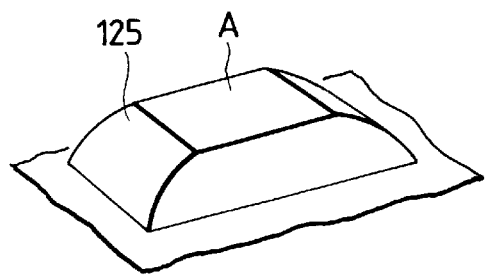
FIG. 36 is a perspective view of a thin-wall forming portion.
Figure 37:
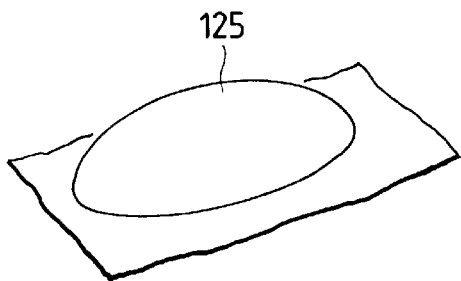
FIG. 37 is a perspective view of a thin-wall forming portion.
Figure 38:
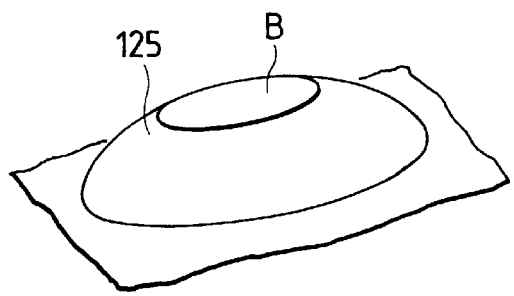
FIG. 38 is a perspective view of a thin-wall forming portion.

The thin-wall forming portions 115 may be modified into thin-wall forming portions 125 as follows. FIG. 34 shows a thin-wall forming portion 125 which has a trapezoidal shape. FIG. 35 shows a thin-wall forming portion 125 which corresponds in shape to a part of a cylinder. FIG. 36 shows a thin-wall forming portion 125 which corresponds in shape to a part of an approximate cylinder having a flat surface "A". FIG. 37 shows a thin-wall forming portion 125 which corresponds in shape to a part of a sphere. FIG. 38 shows a thin-wall forming portion 125 which corresponds in shape to a part of an approximate sphere having a flat surface "B".

The spaces resulting from the backward movement of the hold pins 102 are occupied by the molten resin 106 or the softened resin into which the cooled and solidified resin around the hold pins 102 is converted by the heating of the hold pins 102. The molten resin 106 or the softened resin is subjected to the resin-injecting pressure, being thereby forced toward the spaces resulting from the backward movement of the hold pins 102. To enable reliable transmission of the resin-injecting pressure to the molten resin 106 or the softened resin around the spaces resulting from the backward movement of the hold pins 102, it is preferable that the positions of the hold pins 102 differ or offset from the positions of the thin-wall forming portions 115 as viewed in the direction of the injection of the molten resin 106. In other words, it is preferable that the positions of the hold pins 102 are out of alignment with the positions of the thin-wall forming portions 115 as viewed in the direction of the injection of the molten resin 106.

Figure 39:
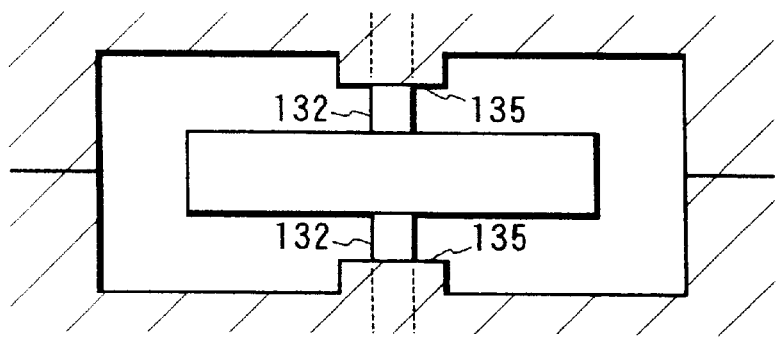
FIG. 39 is a sectional diagram of a die set.
Figure 40:
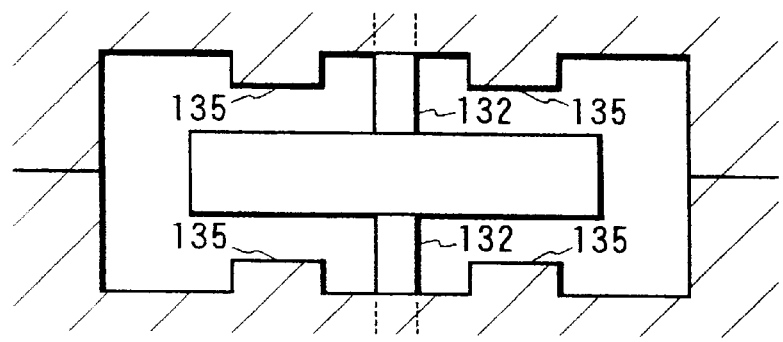
FIG. 40 is a sectional diagram of a die set.
Figure 41:
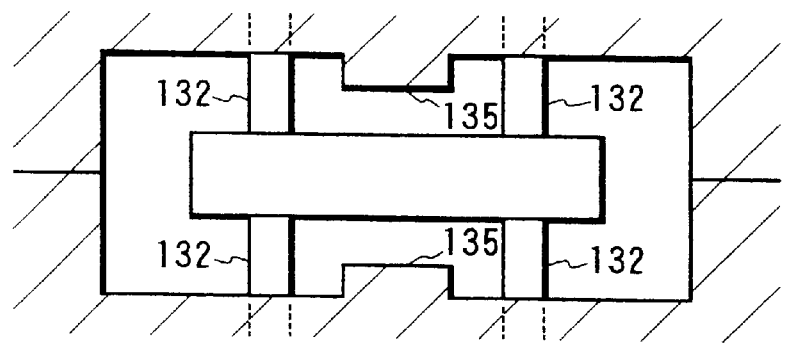
FIG. 41 is a sectional diagram of a die set.

A description will now be given with reference to FIGS. 39, 40, and 41 in which the direction of the injection of molten resin agrees with the direction from the right side to the back side of the drawing sheet. FIG. 39 shows an arrangement in which thin-wall forming portions 135 provided on a die set align with and extend in front of hold pins 132 as viewed along the direction of the injection of molten resin. In the arrangement of FIG. 39, the thin-wall forming portions 135 tend to interfere with the transmission of the resin-injecting pressure toward the spaces resulting from the backward movement of the hold pins 132. FIG. 40 shows an arrangement in which thin-wall forming portions 135 provided on a die set are out of alignment with hold pins 132 as viewed along the direction of the injection of molten resin. In the arrangement of FIG. 40, the thin-wall forming portions 135 hardly interfere with the transmission of the resin-injecting pressure toward the spaces resulting from the backward movement of the hold pins 132. FIG. 41 shows an arrangement in which thin-wall forming portions 135 provided on a die set are out of alignment with hold pins 132 as viewed along the direction of the injection of molten resin. In the arrangement of FIG. 41, the thin-wall forming portions 135 hardly interfere with the transmission of the resin-injecting pressure toward the spaces resulting from the backward movement of the hold pins 132.

Figure 42:
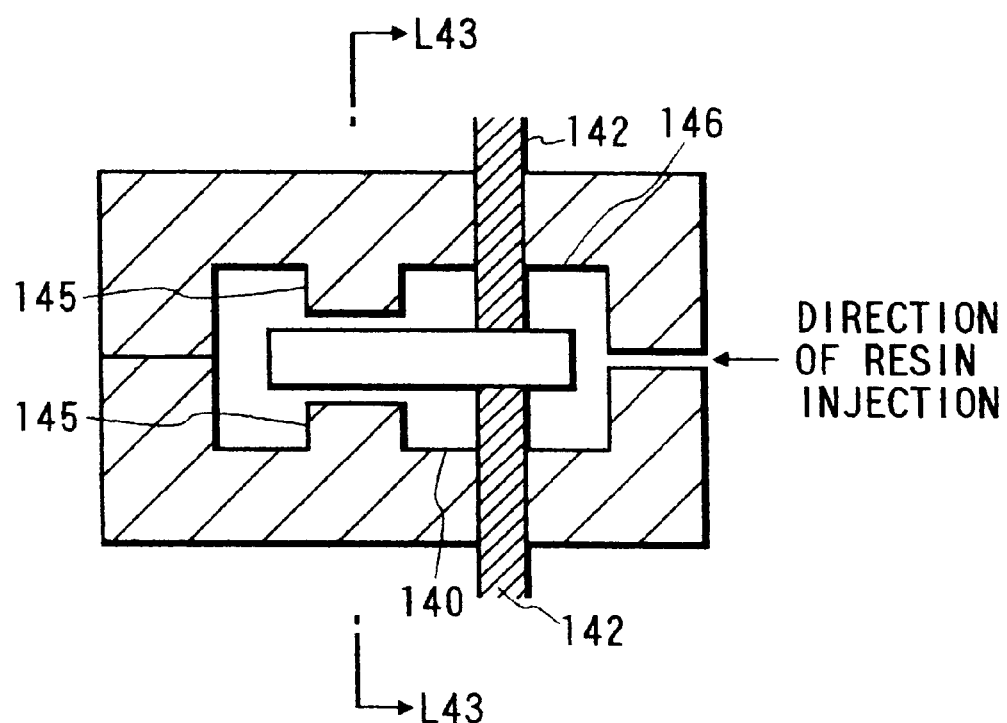
FIG. 42 is a sectional view of a die set.
Figure 43:
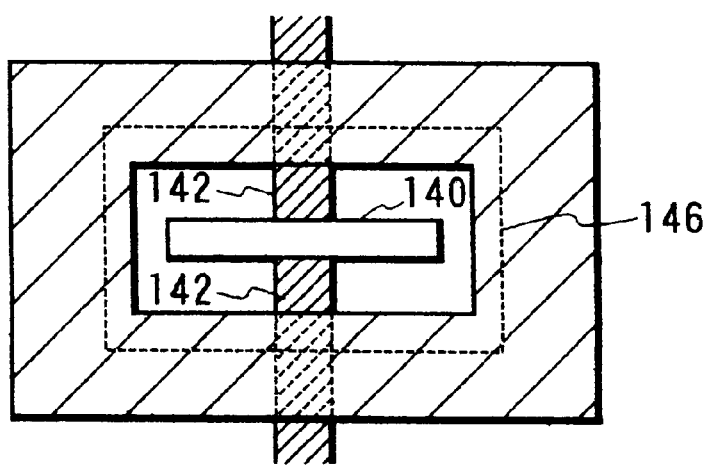
FIG. 43 is a sectional view of the die set taken along the line L43—L43 in FIG. 42.

FIGS. 42 and 43 show an arrangement in which a thin-wall forming portion 145 provided on a die set extends in the rear of hold pins 142 as viewed along the direction of the injection of molten resin. The thin-wall forming portion 145 has an annular configuration, and projects from the inner surfaces of the die set. The thin-wall forming portion 145 extends around an insert 140 in a cavity 146. The thin-wall forming portion 145 may be provided on the insert 140 rather than the die set.

Some of magnetic detection devices include a hybrid IC in which a semiconductor IC, capacitors, and other parts are provided on a ceramic substrate. The ceramic substrate of such a hybrid IC tends to be damaged when being exposed to a high pressure, for example, 20 MPa to 80 MPa. Accordingly, it is preferable to form a hybrid IC into a mold IC by a primary molding process in which the resin-injecting pressure is set to 6 MPa to 8 MPa in order to prevent damage to the ceramic substrate, and used mold material (for example, epoxy material) has a high fluidity. Further, it is preferable to form the mold IC into a final casting (a final molding) by a secondary molding process according to the second embodiment of this invention. During the secondary molding process, the mold IC is used as an insert. It should be noted that the secondary molding process may be based on the first embodiment of this invention rather than the second embodiment thereof.

Figure 44:
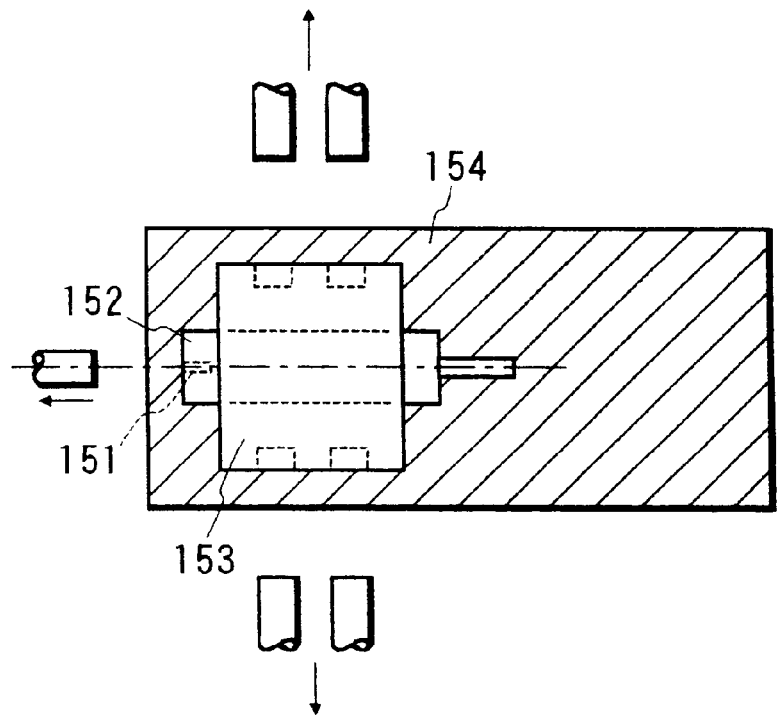
FIG. 44 is a sectional diagram of a casting (a molding).
Figure 45:
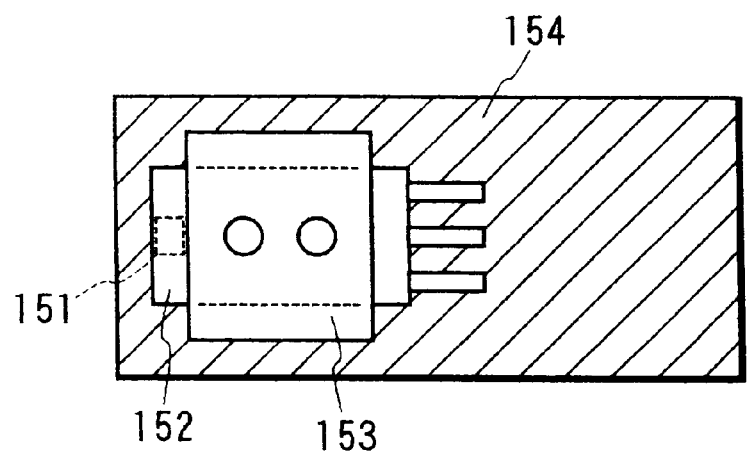
FIG. 45 is a sectional diagram of the casting in FIG. 44.

FIGS. 44 and 45 show an example of a final casting (a final molding) which has a mold IC 152, a hollow magnet 153, and a resin portion 154. The mold IC 152 has a plate-like shape. A sensor element 151 is embedded in one end of the mold IC 152. The hollow magnet 153 is tubular. The hollow magnet 153 has a hole extending through the walls thereof. The mold IC 152 extends through the hole of the hollow magnet 153. The mold IC 152 and the hollow magnet 153 are sealed in the resin portion 154. The final casting in FIGS. 44 and 45 is good in waterproofness.

In the second embodiment of this invention, the insert 105 may be any electric component which is embedded in resin as a result of a molding process or a casting process. Regarding a resultant casting (a resultant molding), the insert 105 may be at least partially sealed in resin. In other words, a part of the insert 105 may be uncovered from the resin. Regarding the final casting, wiring lines or connectors for proving electrical connection between the insert 105 and an external device are exposed. The electric component corresponding to the insert 105 is, for example, an electric coil (an electric inductor), an IC, or a thermistor.

In the second embodiment of this invention, the die set 101 has the cavity 113 therein. The insert 105 is disposed in the cavity 113. The shape of the cavity 113 corresponds to the shape of a casting (a molding) to be formed. The cavity 113 means a space in the die set 101 which corresponds to the final casting. The die set 101 is movable between the open position and the closed position. When the die set 101 is in the open position, the insert 105 can be placed in position with respect thereto or the final casting can be removed therefrom. A first example of the die set 101 has an upper die and a lower die which are relatively movable in vertical directions. A second example of the die set 101 has a fixed die and a movable die which can be moved relative to the fixed die in horizontal directions. It is preferable that the die set 101 is made of metal.

The hold pins 102 provided on the die set 101 serve to fixedly support the insert 105 in a given position within the cavity 113. The hold pins 102 are also referred to as the hold members. The hold members are movable into and from the cavity 113. The hold members are driven by drive devices such as hydraulic cylinders or air cylinders. It is preferable that the hold members are cylindrical. The hold members may have a shape of a square bar or an L-shaped configuration in conformity with the shape of the insert 105. When the hold members assume retracted positions, the front end surfaces of the hold members are substantially flush with or in positional agreement with the inner surfaces of the die set 101. It is preferable that the hold members are made of a steel suited for dies. The hold members may be made of ceramic material which withstands high temperatures.

The die set 101 serves to cool and solidify the molten resin injected into the cavity 113. The hold members may be heated by heating devices corresponding to the electrically-powered heaters 121. The heated hold members prevent the solidification of the molten resin therearound, or change the solidified resin toward the molten state.

The degree of the heating of the hold members by the heating devices is preferably chosen so that the resin around the hold members will remain molten. In the case where the hold members are heated to a temperature higher than the temperature of the inner surfaces of the die set 101, it is possible to suppress the occurrence of unfused portions (minute holes) in the resin of the final casting. It is preferable to heat the hold members to a temperature equal to or higher than the melting point of the resin and equal to or lower than the thermal deterioration point of the resin. The heating devices may be the electrically-powered heaters 121 each including a nichrome wire, a tungsten wire, a platinum wire, or an electrically-conductive ceramic member. It is preferable to place the electrically-powered heaters 121 in the hold members. The electrically-powered heaters 121 may be located outside the hold members. The power supplies 103 for the electrically-powered heaters 121 are, for example, switching power supplies or other power supplies which can feed great constant currents. One power supply 103 may be used per hold member. Alternatively, one power supply 103 may be used per two or more hold members.

In the second embodiment of this invention, it is preferable to use two or more hold members. It should be noted that only one hold member may be provided.

It is preferable that the injected resin is of the thermoplastic type. Examples of the used thermoplastic resin are PBT (polybutylene terephthalate) resin, PPS (polyphenylene sulfide) resin, polyamide-based resin, and polyester-based resin.

Third Embodiment

Figure 46:
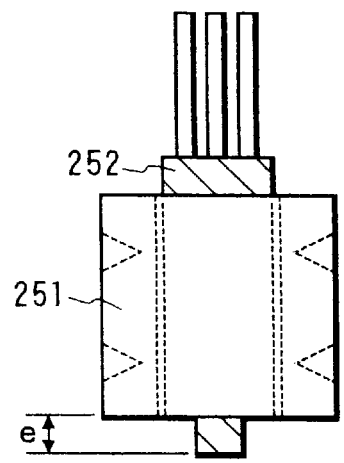
FIG. 46 is a diagram of an insert.

With reference to FIG. 46, an insert has a hollow magnet 251 and a detection device 252. The hollow magnet 251 is tubular. The hollow magnet 251 has a hole extending through the walls thereof. The detection device 252 extends through the hole of the hollow magnet 251. The detection device 252 is secured to the hollow magnet 251.

Figure 47:
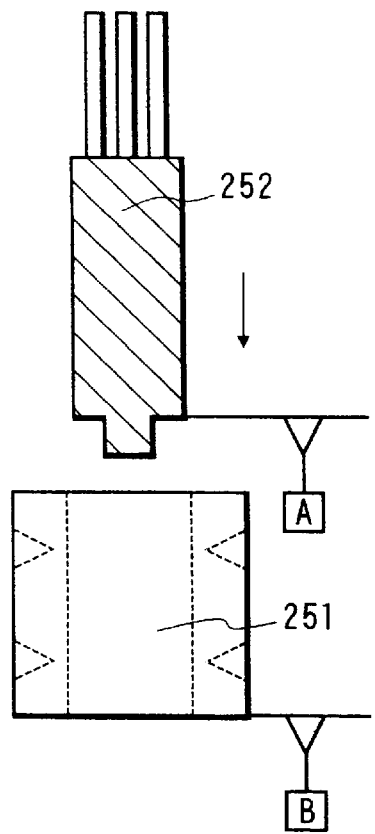
FIG. 47 is an exploded view of the insert in FIG. 46.

As shown in FIG. 47, during the assembly of the insert, the detection device 252 is forced into the hole of the hollow magnet 251 until a datum "A" for the detection device 252 meets a datum "B" for the hollow magnet 251. With reference to FIGS. 46 and 47, the datum "A" and the datum "B" are designed so that the distance "e" between a magnetized surface of the hollow magnet 251 and an end surface of the detection device 252 can be set to a value at which the output characteristics of the detection device 252 will be optimized.

Figure 48:
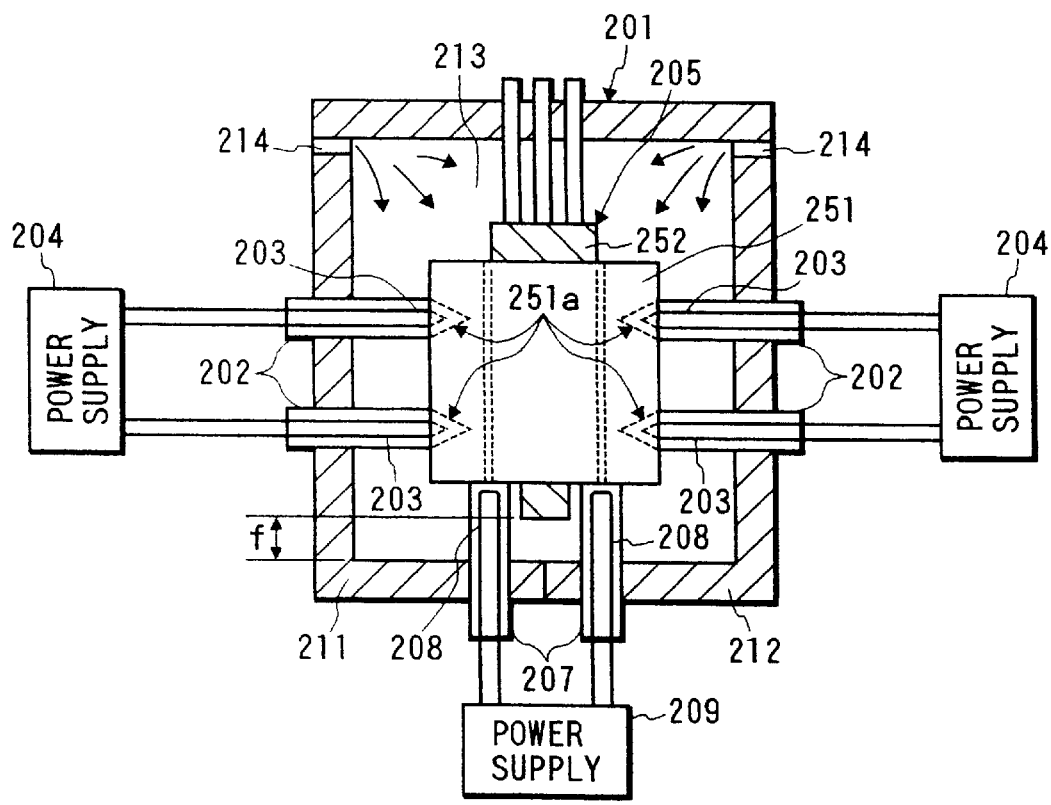
FIG. 48 is a sectional diagram of an apparatus for forming an insert-added casting (an insert-added molding) according to a third embodiment of this invention.

With reference to FIG. 48, an apparatus for forming an insert-added casting (an insert-added molding) includes a die set 201 having a fixed die 211 and a movable die 212. Four hold pins (hold members) 202 are movably provided on the die set 201. Each of the hold pins 202 has a heating device (a heating means). In addition, two support pins (support members) 207 are movably provided on the die set 201. Each of the support pins 207 has a heating device (a heating means).

The movable die 212 can be driven toward and away from the fixed die 211 along leftward and rightward directions as viewed in FIG. 48. The die set 201 moves between a closed position and an open position in accordance with movement of the movable die 212 relative to the fixed die 211. When the die set 201 assumes the closed position, the fixed die 211 and the movable die 212 contact or engage each other. When the die set 201 assumes the open position, the fixed die 211 and the movable die 212 separate from each other. In the case where the die set 201 is in the closed position, the die set 201 has a cavity 213 formed by opposing surfaces of the fixed die 211 and the movable die 212. The shape of the cavity 213 corresponds to the shape of a casting (a molding) to be formed. Upper ends of the die set 201 have gates 214 for transmitting molten resin into the cavity 213.

Two of the hold pins 202 are supported on the fixed die 211 while the other hold pins 202 are supported on the movable die 212. The hold pins 202 horizontally extend through the walls of the central portions of the fixed die 211 and the movable die 212. The hold pins 202 are movable into and from the cavity 213. Each of the hold pins 202 is driven by an air cylinder (a pneumatic actuator) between first and second positions. It should be noted that the air cylinder corresponds to the pneumatic or hydraulic cylinder 95 in FIG. 6. The first positions of the hold pins 202 correspond to projected positions at which front ends of the hold pins 202 hold sides of a hollow magnet 251 of an insert 205 in the cavity 213. When the hold pins 202 assume the second positions, the front ends of the hold pins 202 are substantially in positional agreement with the inner surfaces of the walls of the fixed die 211 and the movable die 212. The second positions of the hold pins 202 are also referred to as the retracted positions.

The hold pins 202 have bodies made of insulating ceramics in which electrically-powered heaters 203 are embedded respectively. The electrically-powered heaters 203 include heating members made of ceramics respectively. The electrically-powered heaters 203 are electrically connected to power supplies 204.

One of the support pins 207 is provided on the fixed die 211 while the other support pin 207 is provided on the movable die 212. The support pins 207 vertically extend through the lower walls of the fixed die 211 and the movable die 212 respectively. The support pins 207 are movable into and from the cavity 213. Each of the support pins 207 is driven by an air cylinder (a pneumatic actuator) between first and second positions. It should be noted that the air cylinder corresponds to the pneumatic or hydraulic cylinder 95 in FIG. 6. The first positions of the support pins 207 correspond to projected positions at which front ends of the support pins 207 bear the lower surfaces of the hollow magnet 251 and a detection device 252 of the insert 205 in the cavity 213. When the support pins 207 assume the second positions, the front ends of the support pins 207 are substantially flash with the walls of the fixed die 211 and the movable die 212. The second positions of the support pins 207 are also referred to as the retracted positions.

The support pins 207 have bodies made of insulating ceramics in which electrically-powered heaters 208 are embedded respectively. The electrically-powered heaters 208 include heating members made of ceramics respectively. The electrically-powered heaters 208 are electrically connected to a power supply 209.

The apparatus of FIG. 48 forms an insert-added casting (an insert-added molding) as follows. An insert 205 is fixed in position within the cavity 213 by the hold pins 202 horizontally projecting into the cavity 213 from the walls of the fixed die 211 and the movable die 212. In this case, the front ends of the hold pins 202 fit into respective recesses 251a provided in a hollow magnet 251 of the insert 205. In addition, the lower surfaces of the hollow magnet 251 and a detection device 252 of the insert 205 are supported by the front ends of the support pins 207 vertically projecting into the cavity 213 from the lower walls of the fixed die 211 and the movable die 212. The distance "f" between the inner surfaces of the lower walls of the die set 201 and the lower end surface of the detection device 252 of the insert 205 is set to a minimum value at which a crack can be prevented from occurring in a corresponding resin portion of a final casting (a final molding).

Subsequently, the cavity 213 in the die set 201 is charged with molten resin by an injection device (not shown in FIG. 48). The molten resin flows through the gates 214 before entering the cavity 213. The molten resin is subjected to a high pressure, for example, 20 MPa to 80 MPa, as an injecting pressure. At the same time, the power supplies 204 and 209 are activated so that electric currents are fed to the electrically-powered heaters 203 and 208. Thus, the hold pins 202 and the support pins 207 are heated to a given temperature higher than the melting point of the resin. During the charging of the cavity 213 with the molten resin, the hollow magnet 251 of the insert 205 is firmly supported by the hold pins 202. In addition, the lower surfaces of the hollow magnet 251 and the detection device 252 are born by the support pins 207 along directions opposite the directions of the flows of the molten resin from the gates 214. Accordingly, the hollow magnet 251 and the detection device 252 of the insert 205 are prevented from moving relative to each other while the insert 205 is firmly fixed in position within the cavity 213. Even when the molten resin meets the hold pins 202 and the support pins 207, cooled and solidified layers are prevented from occurring therearound since the hold pins 202 and the support pins 207 are heated to the given temperature higher than the melting point of the resin.

Then, the air cylinders are activated to move the hold pins 202 back from the cavity 213 to the retracted positions at which the front ends of the hold pins 202 are substantially in positional alignment with the walls of the fixed die 211 and the movable die 212. Simultaneously, the air cylinders are activated to move the support pins 207 back from the cavity 213 to the retracted positions at which the front ends of the support pins 207 are substantially flush with the inner surfaces of the walls of the die set 201. At the same time, the cavity 213 is further charged with the molten resin. After the hold pins 202 and the support pins 207 reach the retracted positions, the electrically-powered heaters 203 and 208 are de-energized. The molten resin smoothly enters and substantially fully occupies the spaces resulting from the backward movement of the hold pins 202 and the support pins 207. The portions of the molten resin which occupy the spaces adequately fuse with the other portion of the molten resin. The spaces resulting from the backward movement of the hold pins 202 and the support pins 207 substantially completely disappear. Therefore, minute holes do not remain in the resin of a final casting. In addition, unfused portions of the resin do not occur. The molten resin in the cavity 213 is cooled and solidified to complete a casting (a molding) which contains the insert 205 sealed in the resin. The completed casting is good in waterproofness.

Figure 49:
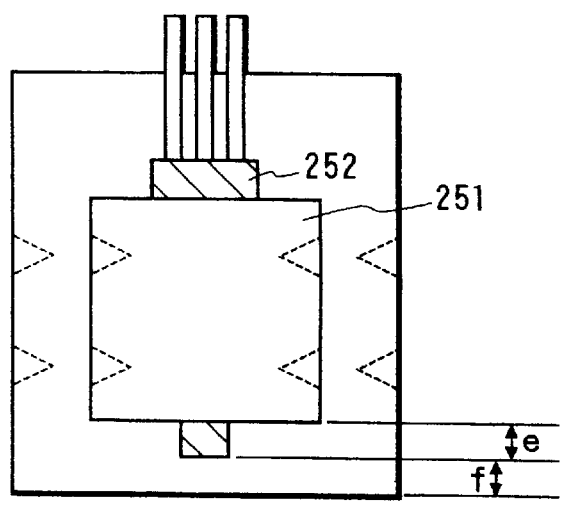
FIG. 49 is a diagram of a casting (a molding).

FIG. 49 shows an example of the completed casting (the completed molding) which contains the insert having the hollow magnet 251 and the detection device 252. The insert is sealed in the resin. Regarding the completed casting, the hollow magnet 251 and the detection device 252 are in a desired positional relation. In addition, the distance "e" between the magnetized surface of the hollow magnet 251 and the end surface of the detection device 252 is equal to a desired value. Further, the thickness of the resin between the lower end surface of the detection device 252 and an outer surface of the completed casting is equal to a desired value. Accordingly, the detection device 252 in the completed casting is good in output characteristics.

As previously described, the front ends of the hold pins 202 fit into the respective recesses 251a in the hollow magnet 251 of the insert 205 during the formation of a casting (a molding). This design enables the insert 205 to be accurately located in position relative to the die set 201. Accordingly, it is possible to accurately set the position of the insert 205 relative to the final casting. It is preferable to taper the recesses 251a in the hollow magnet 251 and the front ends of the hold pins 202. This design enables the insert 205 to be more accurately located in position relative to the die set 201. It should be noted that each of the recesses 251a in the hollow magnet 251 and the front ends of the hold pins 202 may have a tapered portion and a flat portion extending forward of the tapered portion. Alternatively, each of the recesses 251a in the hollow magnet 251 and the front ends of the hold pins 202 may be hemispherical.

In the third embodiment of this invention, the insert 205 may be any electric component which is embedded in resin as a result of a molding process or a casting process. Regarding a resultant casting (a resultant molding), the insert 205 may be at least partially sealed in resin. In other words, a part of the insert 205 may be uncovered from the resin. Regarding the final casting, wiring lines or connectors for proving electrical connection between the insert 205 and an external device are exposed. The electric component corresponding to the insert 205 is, for example, an electric coil (an electric inductor), an IC, or a thermistor.

In the third embodiment of this invention, the die set 201 has the cavity 213 therein. The insert 205 is disposed in the cavity 213. The shape of the cavity 213 corresponds to the shape of a casting (a molding) to be formed. The cavity 213 means a space in the die set 201 which corresponds to the final casting. The die set 201 is movable between the open position and the closed position.

When the die set 201 is in the open position, the insert 205 can be placed in position with respect thereto or the final casting can be removed therefrom. A first example of the die set 201 has an upper die and a lower die which are relatively movable in vertical directions. A second example of the die set 201 has a fixed die and a movable die which can be moved relative to the fixed die in horizontal directions. It is preferable that the die set 201 is made of metal.

The hold pins 202 provided on the die set 201 serve to fixedly support the insert 205 in a given position within the cavity 213. The hold pins 202 are also referred to as the hold members. The hold members are movable into and from the cavity 213. The hold members are driven by drive devices such as hydraulic cylinders or air cylinders. It is preferable that the hold members are cylindrical. The hold members may have a shape of a square bar or an L-shaped configuration in conformity with the shape of the insert 205. When the hold members assume retracted positions, the front end surfaces of the hold members are substantially flush with or in positional agreement with the inner surfaces of the die set 201. It is preferable that the hold members are made of a steel suited for dies. The hold members may be made of ceramic material which withstands high temperatures.

The die set 201 serves to cool and solidify the molten resin injected into the cavity 213. The hold members may be heated by heating devices corresponding to the electrically-powered heaters 203. The heated hold members prevent the solidification of the molten resin therearound, or change the solidified resin toward the molten state.

The degree of the heating of the hold members by the heating devices is preferably chosen so that the resin around the hold members will remain molten. In the case where the hold members are heated to a temperature higher than the temperature of the inner surfaces of the die set 201, it is possible to suppress the occurrence of unfused portions (minute holes) in the resin of the final casting. It is preferable to heat the hold members to a temperature equal to or higher than the melting point of the resin and equal to or lower than the thermal deterioration point of the resin. The heating devices may be the electrically-powered heaters 203 each including a nichrome wire, a tungsten wire, a platinum wire, or an electrically-conductive ceramic member. It is preferable to place the electrically-powered heaters 203 in the hold members. The electrically-powered heaters 203 may be located outside the hold members. The power supplies 204 for the electrically-powered heaters 203 are, for example, switching power supplies or other power supplies which can feed great constant currents. One power supply 204 may be used per hold member. Alternatively, one power supply 204 may be used per two or more hold members.

In the third embodiment of this invention, it is preferable to use two or more hold members. It should be noted that only one hold member may be provided.

It is preferable that the injected resin is of the thermoplastic type. Examples of the used thermoplastic resin are PBT (polybutylene terephthalate) resin, PPS (polyphenylene sulfide) resin, polyamide-based resin, and polyester-based resin.

What is claimed is:

1. A method of forming an insert molding, comprising the steps of:

holding an insert in a cavity within a die set by a movable hold member;

injecting molten resin into the cavity while the insert is held by the hold member;

separating the hold member from the insert at a given timing; and cooling a first region of the molten resin in the cavity at a rate greater than a rate of cooling of a second region of the molten resin in the cavity such that the first region of the molten resin solidifies before the second region of the molten resin solidifies, the second region adjoining the hold member, the first region being more distant from the hold member than the second region is.

2. A method as recited in claim 1, wherein the first region is thinner than the second region.

3. A method as recited in claim, 2, wherein the die has a projection which extends from a wall of the cavity such that a distance between an end of said projection and a surface of said insert is less than a distance between surrounding portions of said wall and said surface of the insert, and wherein said first region is form ed by a portion of the molten resin which fills a zone between the end of said projection and said surface of the insert.

4. A method as recited in claim 2, wherein the insert has a projection which extends from a surface thereof toward a wall of the cavity such that a distance between an end of said projection and said wall is less than a distance between surrounding portions of said surface of the insert and said wall, and wherein said first region is formed by a portion of the molten resin which fills a zone between the end of said projection and said wall.

5. A method as recited in claim 1, further comprising heating the hold member to a temperature higher than the melting point of the resin when the resin is injected into the cavity.

\* \* \* \* \*